(12) United States Patent
Yamaguchi et al.

(10) Patent No.: US 10,443,524 B2
(45) Date of Patent: Oct. 15, 2019

(54) EXHAUST EMISSION CONTROL SYSTEM OF ENGINE

(71) Applicant: Mazda Motor Corporation, Aki-gun, Hiroshima (JP)

(72) Inventors: Takayuki Yamaguchi, Hatsukaichi (JP); Masanobu Kanno, Hiroshima (JP); Masayuki Tetsuno, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 241 days.

(21) Appl. No.: 15/641,139

(22) Filed: Jul. 3, 2017

(65) Prior Publication Data

US 2018/0038301 A1 Feb. 8, 2018

(30) Foreign Application Priority Data

Aug. 2, 2016 (JP) .................................. 2016-151675

(51) Int. Cl.
*F02D 41/14* (2006.01)
*B01D 53/94* (2006.01)
(Continued)

(52) U.S. Cl.
CPC ..... *F02D 41/1454* (2013.01); *B01D 53/9418* (2013.01); *B01D 53/9431* (2013.01);
(Continued)

(58) Field of Classification Search
CPC ............. F02D 41/1415; F02D 41/0002; F02D 41/405; F02D 41/10; F02D 41/0235;
(Continued)

(56) References Cited

U.S. PATENT DOCUMENTS

| 4,748,812 A * | 6/1988 | Okada ................... F02B 37/005 60/614 |
| 6,173,568 B1 * | 1/2001 | Zurbig ............... B01D 53/9431 123/406.53 |
| 2016/0333808 A1 * | 11/2016 | Kobayashi .......... F02D 41/0275 |

FOREIGN PATENT DOCUMENTS

JP 2000265828 A * 9/2000 ........... F01N 3/0814
JP 3518398 B2 4/2004
(Continued)

*Primary Examiner* — Patrick D Maines
(74) *Attorney, Agent, or Firm* — Alleman Hall Creasman & Tuttle LLP

(57) ABSTRACT

An exhaust emission control system of an engine including a $NO_x$ catalyst disposed in an exhaust passage and for storing $NO_x$ within exhaust gas when an air-fuel ratio of the exhaust gas is lean, and reducing the stored $NO_x$ when the air-fuel ratio is approximately stoichiometric or rich, is provided. The system includes a SCR catalyst disposed downstream of the $NO_x$ catalyst and for purifying $NO_x$ by causing a reaction with ammonia, and a processor configured to execute a $NO_x$ reduction controlling module for controlling the air-fuel ratio to a target ratio so that the stored $NO_x$ is reduced. The controlling module limits the performance of the $NO_x$ reduction control when a temperature of the SCR catalyst is above a given temperature and loosens the limitation in a given engine operating state in which an exhaust gas flow rate is above a given rate despite the SCR catalyst temperature.

7 Claims, 10 Drawing Sheets

(51) Int. Cl.
*F01N 3/08* (2006.01)
*F01N 3/20* (2006.01)
*F01N 9/00* (2006.01)
*F02D 41/00* (2006.01)
*F02D 41/02* (2006.01)
*F02D 41/10* (2006.01)
*F02D 41/40* (2006.01)

(52) U.S. Cl.
CPC ....... B01D 53/9495 (2013.01); F01N 3/0814 (2013.01); F01N 3/0842 (2013.01); F01N 3/2066 (2013.01); F01N 9/00 (2013.01); F02D 41/0002 (2013.01); F02D 41/0007 (2013.01); F02D 41/0047 (2013.01); F02D 41/025 (2013.01); F02D 41/0235 (2013.01); F02D 41/0275 (2013.01); F02D 41/10 (2013.01); F02D 41/405 (2013.01); *B01D 53/9477* (2013.01); *B01D 2251/2067* (2013.01); *B01D 2255/2065* (2013.01); *B01D 2255/20707* (2013.01); *B01D 2255/20738* (2013.01); *B01D 2255/20776* (2013.01); *B01D 2255/50* (2013.01); *B01D 2255/91* (2013.01); *B01D 2255/911* (2013.01); *B01D 2257/404* (2013.01); *B01D 2257/502* (2013.01); *B01D 2257/702* (2013.01); *B01D 2258/012* (2013.01); *F01N 2570/14* (2013.01); *F01N 2610/02* (2013.01); *F01N 2900/08* (2013.01); *F01N 2900/14* (2013.01); *F01N 2900/1602* (2013.01); *F01N 2900/1614* (2013.01); *F02D 2200/0802* (2013.01); *F02D 2200/0806* (2013.01); *F02D 2200/101* (2013.01); *F02D 2200/501* (2013.01); *F02D 2200/602* (2013.01); *F02D 2250/36* (2013.01); *Y02T 10/144* (2013.01); *Y02T 10/26* (2013.01); *Y02T 10/44* (2013.01); *Y02T 10/47* (2013.01)

(58) Field of Classification Search
CPC .... F01N 3/0814; F01N 3/0842; F01N 3/2066; F01N 9/00; B01D 53/9418; B01D 53/9495
See application file for complete search history.

(56) References Cited

FOREIGN PATENT DOCUMENTS

JP   2006274986 A   * 10/2006
JP   2010112345 A     5/2010

* cited by examiner

EXHAUST EMISSION CONTROL SYSTEM OF ENGINE

BACKGROUND

The present invention relates to an exhaust emission control system of an engine, and particularly to an exhaust emission control system which is provided on an exhaust passage with a $NO_x$ catalyst and a SCR (Selective Catalytic Reduction) catalyst which purify $NO_x$ in exhaust gas.

Conventionally, $NO_x$ storage catalysts which store (occlude) $NO_x$ contained in exhaust gas when an air-fuel ratio of the exhaust gas is lean (i.e., $\lambda>1$, larger than a theoretical air-fuel ratio) are known. Such $NO_x$ storage-reduction catalysts further reduce the stored $NO_x$ when the air-fuel ratio is approximately equal to stoichiometric (i.e., $\lambda \approx 1$, approximately equal to the theoretical air-fuel ratio) or is rich (i.e., $\lambda<1$, smaller than the theoretical air-fuel ratio). Within a normal operating range of an engine, the engine is operated at the lean air-fuel ratio ($\lambda>1$) so as to reduce a fuel consumption, although if this lean operation state continues for a while, the $NO_x$ stored amount in the $NO_x$ catalyst reaches a limit value and the $NO_x$ catalyst can no longer store $NO_x$, which causes $NO_x$ to be released. For this reason, the air-fuel ratio is suitably set to be stoichiometric or richer ($\lambda \leq 1$) in order to reduce $NO_x$ stored in the $NO_x$ catalyst (hereinafter, the control for reducing $NO_x$ stored in the $NO_x$ catalyst is referred to as "$NO_x$ reduction control"). Note that "$\lambda$" is an index of the air-fuel ratio expressed with reference to the theoretical air-fuel ratio, and is a so-called air excess ratio.

Further, an exhaust emission control system provided, not only with such a $NO_x$ catalyst, but also with a SCR catalyst for selectively reducing and purifying $NO_x$ within exhaust gas while using ammonia ($NH_3$) as a reducing agent is recently developed. For example, JP3518398B discloses an art for controlling a SCR catalyst to function when an engine load is high and an engine speed is high, and otherwise controlling a $NO_x$ catalyst to function. Further, JP2010-112345A discloses an art for controlling the SCR catalyst to adsorb ammonia generated by the $NO_x$ catalyst during a $NO_x$ reduction control, and purifying NO using the adsorbed ammonia.

In the art of JP3518398B, since the SCR catalyst has a comparatively high temperature and is active when the engine load and speed are high, $NO_x$ is purified by the SCR catalyst instead of the $NO_x$ catalyst. Even when the SCR catalyst temperature is comparatively high, if the flow rate of exhaust gas is high, the SCR catalyst cannot suitably purify $NO_x$ alone. Therefore, purifying $NO_x$ only by the SCR catalyst when the SCR catalyst temperature is comparatively high without considering the flow rate of the exhaust gas may be insufficient and $NO_x$ may be discharged.

SUMMARY

The present invention is made in view of the issues of the conventional arts described above, and aims to provide an exhaust emission control system of an engine, which has a $NO_x$ catalyst and a SCR catalyst and surely performs a $NO_x$ reduction control when the flow rate of exhaust gas is high even if the temperature of the SCR catalyst is above a given value so that $NO_x$ discharge is suitably prevented.

According to one aspect of the present invention, an exhaust emission control system of an engine, including a $NO_x$ catalyst disposed in an exhaust passage of the engine and for storing $NO_x$ within exhaust gas when an air-fuel ratio of the exhaust gas is lean, and reducing the stored $NO_x$ when the air-fuel ratio is approximately stoichiometric or rich, is provided. The system includes a SCR catalyst disposed in the exhaust passage downstream of the $NO_x$ catalyst and for purifying $NO_x$ within exhaust gas by causing a reaction with ammonia, and a processor configured to execute a $NO_x$ reduction controlling module for performing a $NO_x$ reduction control in which the air-fuel ratio is controlled to a target air-fuel ratio so that the stored $NO_x$ is reduced, the target air-fuel ratio being a ratio at which the stored $NO_x$ is reducible. The $NO_x$ reduction controlling module limits the performance of the $NO_x$ reduction control when temperature of the SCR catalyst is above a given temperature, the limitation of the performance of the $NO_x$ reduction control being loosened in a given operating state of the engine in which a flow rate of the exhaust gas is above a given rate even when the temperature of the SCR catalyst is above the given temperature.

With this configuration, when the temperature of the SCR catalyst is above the given temperature, typically, $NO_x$ is purified by the SCR catalyst and the performance of the $NO_x$ reduction control is limited. Even if the temperature of the SCR catalyst is above the given temperature, in the given operating state of the engine in which the exhaust gas flow rate is above a given rate, the limitation on the performance of the $NO_x$ reduction control is loosened. As a result, in a situation where the SCR catalyst cannot sufficiently purify $NO_x$ due to a high exhaust gas flow rate, it is possible to secure $NO_x$ purification performance of the $NO_x$ catalyst by performing the NOR reduction control, and discharge of $NO_x$ is suitably prevented. In other words, it is possible to improve emission performance regarding $NO_x$.

The $NO_x$ reduction controlling module may set a determination value for the NOR stored amount and permit the performance of the $NO_x$ reduction control when the $NO_x$ stored amount is above the determination value. When the temperature of the SCR catalyst is above the given temperature in the given operating state of the engine, the $NO_x$ reduction controlling module may set the determination value smaller than in an operating state of the engine in which the flow rate of the exhaust gas is below the given rate, so as to loosen the limitation on the performance of the $NO_x$ reduction control.

With this configuration, in a case where the temperature of the SCR catalyst is above the given temperature, when the exhaust gas flow rate is high, the determination value used for determining whether to perform the $NO_x$ reduction control (threshold for determining the NOR stored amount in the $NO_x$ catalyst) is lower than when the exhaust gas flow rate is low, thus, performance of the $NO_x$ reduction control is more likely to be permitted when the exhaust gas flow rate is high.

The $NO_x$ reduction controlling module may set the determination value to be smaller as the flow rate of the exhaust gas increases.

With this configuration, since the determination value is set to be smaller as the exhaust gas flow rate increases and the $NO_x$ reduction control is performed according to the set determination value, the $NO_x$ stored amount in the $NO_x$ catalyst is suitably controlled. For example, it is possible to reduce the $NO_x$ stored amount of the $NO_x$ catalyst by the $NO_x$ reduction control to the determination value by setting the determination value according to the $NO_x$ purification performance of the SCR catalyst (corresponding to the exhaust gas flow rate), and sufficient $NO_x$ purification performance of the $NO_x$ catalyst is suitably secured according to the $NO_x$ purification performance of the SCR catalyst.

The $NO_x$ reduction controlling module may set the determination value to be smaller as at least one of an engine speed and an engine load is higher.

With this configuration, the exhaust gas flow rate is determined based on at least one of the engine speed and the engine load, and the determination value is suitably set according to the $NO_x$ purification performance of the SCR catalyst. Also by this, the $NO_x$ stored amount in the $NO_x$ catalyst is suitably reduced by the $NO_x$ reduction control and the $NO_x$ purification performance of the $NO_x$ catalyst is effectively secured.

The given operating state may correspond to an operating range of the engine where an engine speed is above a given speed and an engine load is above a given load.

When the air-fuel ratio becomes rich due to acceleration of a vehicle, the $NO_x$ reduction controlling module may perform the $NO_x$ reduction control to temporarily control the air-fuel ratio to the target air-fuel ratio.

With this configuration, since the $NO_x$ reduction control is performed at the time of acceleration, which is when the air-fuel ratio becomes rich, compared to a case where the $NO_x$ reduction control is performed in a situation where the air-fuel ratio does not become rich, the $NO_x$ reduction control is performed while preventing a fuel consumption increase. In addition, the $NO_x$ reduction control is performed comparatively frequently and the $NO_x$ stored amount in the $NO_x$ catalyst is efficiently reduced.

The $NO_x$ reduction controlling module may perform (1) a first $NO_x$ reduction control in which the air-fuel ratio is temporarily controlled to the target air-fuel ratio when the air-fuel ratio becomes rich due to acceleration of a vehicle, and (2) a second $NO_x$ reduction control in which the air-fuel ratio is continuously controlled to the target air-fuel ratio regardless of the air-fuel ratio becoming rich due to the acceleration of the vehicle so that the $NO_x$ stored amount falls below a given amount by reducing the $NO_x$ stored in the $NO_x$ catalyst. When the temperature of the SCR catalyst is above the given temperature, the $NO_x$ reduction controlling module may limit the performance of the second $NO_x$ reduction control regardless of the flow rate of the exhaust gas being above the given rate, and loosen the limitation on the performance of the first $NO_x$ reduction control in the operating state of the engine.

With this configuration, the limitation on the performance of $NO_x$ reduction control when the temperature of the SCR catalyst is above the given temperature and the exhaust gas flow rate is high is loosened in the first $NO_x$ reduction control which is performed at the time of acceleration of the vehicle (typically, increasing the speed and/or the load). Therefore, the first $NO_x$ reduction control is suitably performed within the operating range of the engine where the exhaust gas flow rate is high (particularly, high-speed, high-load range) and the $NO_x$ purification performance of the $NO_x$ catalyst is effectively secured. On the other hand, the performance limitation described above is not loosened in the second $NO_x$ reduction control that is performed regardless of the acceleration of the vehicle, therefore, the second $NO_x$ reduction control is prevented from being performed within the operating range where the SCR catalyst sufficiently purifies $NO_x$.

The $NO_x$ reduction controlling module may limit the performance of the NOR reduction control by prohibiting the performance.

With this configuration, when the temperature of the SCR catalyst is above the given temperature and in a situation where the SCR catalyst sufficiently purifies $NO_x$, the performance of the $NO_x$ reduction control is prohibited and only the SCR catalyst functions suitably.

DETAILED DESCRIPTION OF EMBODIMENT

Hereinafter, an exhaust emission control system of an engine according to one embodiment of the present invention is described with reference to the accompanying drawings.

<System Configuration>

First, an engine system to which the exhaust emission control system of the engine of this embodiment is applied is described with reference to a schematic configuration view of the engine system in FIG. 1.

Figure 1:
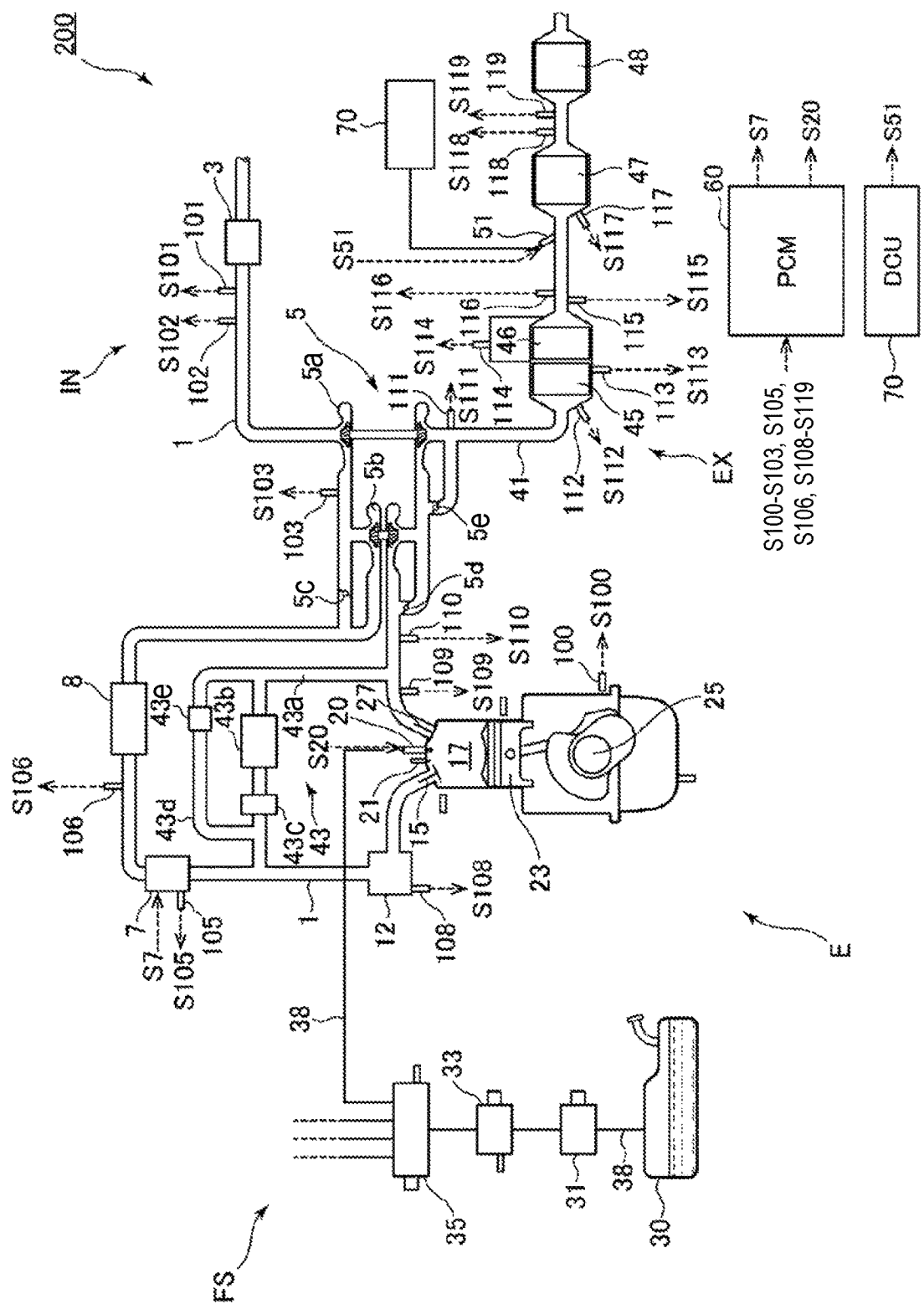
FIG. 1 is a view illustrating a schematic configuration of an engine system to which an exhaust emission control system of an engine according to one embodiment of the present invention is applied.

As illustrated in FIG. 1, the engine system 200 mainly includes a diesel engine as an engine E, an intake system IN for supplying intake air into the engine E, a fuel supply system FS for supplying fuel into the engine E, an exhaust system EX for discharging exhaust gas from the engine E, sensors 100 to 103, 105, 106, and 108 to 119 for detecting various states relating to the engine system 200, a PCM (Power-train Control Module; controller) 60 for controlling the engine system 200, and a DCU (Dosing Control Unit) 70 for executing a control relating to a SCR (Selective Catalytic Reduction) catalyst 47.

First, the intake system IN includes an intake passage 1 through which intake air passes. In the intake passage 1, an air cleaner 3 for purifying air introduced from outside, a compressor of a turbocharger 5 for compressing intake air passing therethrough to increase pressure of the intake air, an intercooler 8 for cooling the intake air with outdoor air or cooling water, an intake shutter valve 7 (corresponding to a throttle valve) for adjusting a flow rate of intake air passing therethrough, and a surge tank 12 for temporarily storing intake air to be supplied into the engine E are provided in this order from the upstream.

Further in the intake system IN, an airflow sensor 101 for detecting an intake air amount and a temperature sensor 102 for detecting an intake air temperature are disposed in the intake passage 1 immediately downstream of the air cleaner 3. A pressure sensor 103 for detecting pressure of the intake air is provided to the turbocharger 5. A temperature sensor 106 for detecting an intake air temperature is disposed in the intake passage 1 immediately downstream of the intercooler 8. A position sensor 105 for detecting an opening of the intake shutter valve 7 is provided to the intake shutter valve 7. A pressure sensor 108 for detecting pressure of intake air in an intake manifold is provided to the surge tank 12. The various sensors 101 to 103, 105, 106 and 108 provided in the intake system IN output detection signals S101 to S103, S105, S106 and S108 corresponding to the detected parameters to the PCM 60, respectively.

Next, the engine E includes an intake valve 15 for introducing the intake air supplied from the intake passage 1 (more specifically, intake manifold) into a combustion chamber 17, a fuel injector 20 for injecting fuel to the combustion chamber 17, a glow plug 21 provided with a heat generating part for generating heat when energized, a piston 23 that reciprocates due to combustion of air-fuel mixture within the combustion chamber 17, a crankshaft 25 that rotates due to the reciprocation of the piston 23, and an exhaust valve 27 for discharging the exhaust gas generated by the combustion of the air-fuel mixture within the combustion chamber 17 to an exhaust passage 41. The engine E is also provided with a crank angle sensor 100 for detecting a crank angle which is a rotational angle of the crankshaft 25 measured, for example, with reference to a top dead center. The crank angle sensor 100 outputs a detection signal S100 corresponding to the detected crank angle to the PCM 60 which acquires an engine speed based on the detection signal S100.

The fuel supply system FS has a fuel tank 30 for storing the fuel and a fuel supply passage 38 for supplying the fuel from the fuel tank 30 to the fuel injector 20. In the fuel supply passage 38, a low-pressure fuel pump 31, a high-pressure fuel pump 33, and a common rail 35 are disposed in this order from the upstream.

Next, the exhaust system EX includes the exhaust passage 41 through which the exhaust gas passes. In the exhaust passage 41, a turbine of the turbocharger 5 that is rotated by the exhaust gas passing therethrough and drives the compressor by this rotation is disposed. Further the following components are disposed in the exhaust passage 41 on the downstream side of the turbine in the following order from the upstream: a $NO_x$ catalyst 45 for purifying $NO_x$ within the exhaust gas; a diesel particulate filter (DPF) 46 for capturing particulate matter (PM) within the exhaust gas; a urea injector 51 for injecting urea (typically, urea water) into the exhaust passage 41 downstream of the DPF 46; the SCR catalyst 47 for producing ammonia by hydrolysis of urea injected by the urea injector 51 and purifying $NO_x$ by causing a reaction (reduction) of this ammonia with $NO_x$ within the exhaust gas; and a slip catalyst 48 for oxidizing ammonia released from the SCR catalyst 47 to purify it. Note that the urea injector 51 is controlled to inject urea into the exhaust passage 41 based on a control signal S51 supplied from the DCU 70.

Here, the $NO_x$ catalyst 45 and the SCR catalyst 47 are described more in detail. The $NO_x$ catalyst 45 is a $NO_x$ storage catalyst (NSC) which stores $NO_x$ contained within the exhaust gas when an air-fuel ratio of the exhaust gas is lean (i.e., $\lambda>1$, larger than a theoretical air-fuel ratio), and reduces the stored $NO_x$ when the air-fuel ratio is approximately equal to stoichiometric (i.e., $\lambda\approx1$, approximately equal to the theoretical air-fuel ratio) or is rich (i.e., $\lambda<1$, smaller than the theoretical air-fuel ratio). The $NO_x$ catalyst 45 generates ammonia when reducing the stored NOR, and releases it. For example, in the $NO_x$ reduction control, ammonia ($NH_3$) is generated by combining "N" within $NO_x$ stored in the $NO_x$ catalyst 45 and "H" within "HC," such as unburned fuel supplied to the $NO_x$ catalyst 45 as a reducing agent.

The $NO_x$ catalyst 45 functions, not only as the NSC, but also as a diesel oxidation catalyst (DOC) which oxidizes hydrocarbon (HC), carbon monoxide (CO), etc. using oxygen within the exhaust gas to convert them into water and carbon dioxide. For example, the NOR catalyst 45 is made by coating a surface of a catalyst material layer of DOC with a catalyst material of NSC.

On the other hand, the SCR catalyst 47 adsorbs ammonia generated by urea injected from the urea injector 51 and ammonia generated by the $NO_x$ reduction in the $NO_x$ catalyst 45, and causes a reaction of the adsorbed ammonia with $NO_x$ to reduce and purify NOR. For example, the SCR catalyst 47 is made by supporting catalyst metal which reduces $NO_x$ with ammonia on a zeolite which traps ammonia to form a catalyst component, and supporting this catalyst component on a cell wall of a honeycomb carrier. Fe, Ti, Ce, W, etc. is used as the catalyst metal for $NO_x$ reduction.

Note that in view of achieving both of securing the $NO_x$ purification performance by the SCR catalyst 47 and preventing the release (slip) of ammonia from the SCR catalyst 47, the DCU 70 controls the urea injector 51 to inject urea so that a suitable amount of ammonia is adsorbed to the SCR catalyst 47. In this case, since the ammonia adsorption capacity changes according to the temperature of the SCR catalyst 47 (specifically, it becomes easier for ammonia to be released from the SCR catalyst 47 as the temperature of the SCR catalyst 47 increases), the DCU 70 controls the urea injector 51 to inject urea in consideration of the temperature of the SCR catalyst 47.

Further in the exhaust system EX, as illustrated in FIG. 1, a pressure sensor 109 for detecting pressure of the exhaust gas and a temperature sensor 110 for detecting an exhaust gas temperature are disposed in the exhaust passage 41 upstream of the turbine of the turbocharger 5. An $O_2$ sensor 111 for detecting an oxygen concentration within the exhaust gas is disposed in the exhaust passage 41 immediately downstream of the turbine of the turbocharger 5. Moreover, the exhaust system EX includes a temperature sensor 112 for detecting an exhaust gas temperature at a position immediately upstream of the $NO_x$ catalyst 45, a temperature sensor 113 for detecting an exhaust gas temperature at a position between the $NO_x$ catalyst 45 and the DPF 46, a pressure difference sensor 114 for detecting a pressure difference of exhaust gas between positions immediately upstream and downstream of the DPF 46, a temperature sensor 115 for detecting an exhaust gas temperature at a position immediately downstream of the DPF 46, a $NO_x$ sensor 116 for detecting a concentration of $NO_x$ within the exhaust gas at a position immediately downstream of the DPF 46, a temperature sensor 117 for detecting an exhaust gas temperature at a position immediately upstream of the SCR catalyst 47, an $NO_x$ sensor 118 for detecting a concentration of $NO_x$ within the exhaust gas at a position immediately downstream of the SCR catalyst 47, and a PM sensor 119 for detecting PM within the exhaust gas at a position immediately upstream of the slip catalyst 48. The various sensors 109 to 119 provided in the exhaust system EX output detection signals S109 to S119 corresponding to the detected parameters to the PCM 60, respectively.

In this embodiment, the turbocharger 5 is configured as a two-stage turbocharging system capable of efficiently obtaining high turbocharging performance in all low to high engine speed ranges. The exhaust energy is low within the low engine speed range. That is, the turbocharger 5 includes a large turbocharger 5a for turbocharging a large amount of air within a high engine speed range, a small turbocharger 5b capable of performing efficient turbocharging even with low exhaust energy, a compressor bypass valve 5c for controlling the flow of intake air to a compressor of the small turbocharger 5b, a regulator valve 5d for controlling the flow of exhaust gas to a turbine of the small turbocharger 5b, and a wastegate valve 5e for controlling the flow of exhaust gas to a turbine of the large turbocharger 5a. By driving each valve in accordance with the operating state of the engine E (engine speed and load), the operated turbocharger is switched between the large turbocharger 5a and the small turbocharger 5b.

The engine system 200 of this embodiment also includes an exhaust gas recirculation (EGR) device 43. The EGR device 43 includes an EGR passage 43a connecting a position of the exhaust passage 41 upstream of the turbine of the turbocharger 5 with a position of the intake passage 1 downstream of the compressor of the turbocharger 5 (more specifically, downstream of the intercooler 8), an EGR cooler 43b for cooling the exhaust gas passing through the EGR passage 43a, a first EGR valve 43c for adjusting a flow rate of the exhaust gas passing through the EGR passage 43a, an EGR cooler bypass passage 43d for causing the exhaust gas to bypass the EGR cooler 43b, and a second EGR valve 43e for adjusting a flow rate of the exhaust gas passing through the EGR cooler bypass passage 43d.

Figure 2:
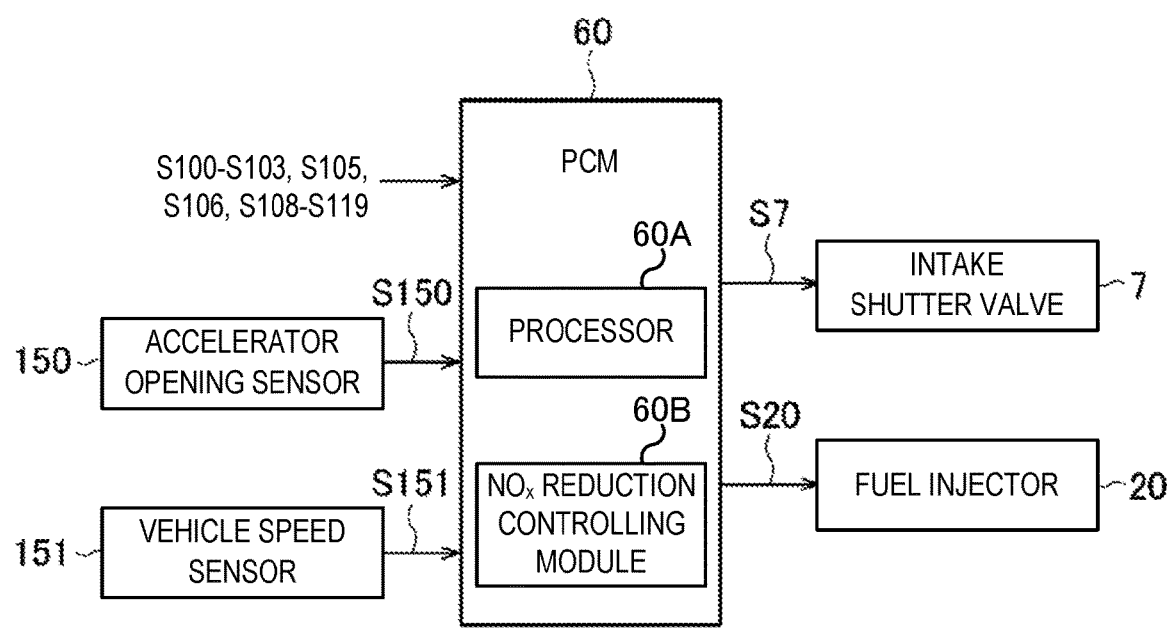
FIG. 2 is a block diagram illustrating an electrical configuration of the exhaust emission control system of the engine of the embodiment.

Next, an electrical configuration of the exhaust emission control system of the engine of the embodiment is described with reference to FIG. 2.

Based on the detection signals S100 to S103, S105, S106 and S108 to S119 of the various sensors 100 to 103, 105, 106 and 108 to 119 described above, and detection signals S150 and S151 outputted by an accelerator opening sensor 150 for detecting a position of an accelerator pedal (accelerator opening) and a vehicle speed sensor 151 for detecting a vehicle speed, respectively, the PCM 60 of this embodiment outputs a control signal S20 for mainly controlling the fuel injector 20, and a control signal S7 for controlling the intake shutter valve 7.

Particularly in this embodiment, the PCM 60 executes a $NO_x$ reduction control in which the fuel injector 20 is controlled to perform a post injection to control the air-fuel ratio of the exhaust gas to a target air-fuel ratio (specifically, a given air-fuel ratio approximately equal to or smaller than a theoretical air-fuel ratio), so that the $NO_x$ catalyst 45 is controlled to reduce $NO_x$ stored therein. In other words, the PCM 60 performs the post injection after a main injection. In the main injection, the fuel is injected into the cylinder (in the main injection, typically various settings including a fuel injection amount are executed so as to obtain a lean air-fuel ratio) so as to output an engine torque according to an accelerator operation by a vehicle operator. In the post injection, the fuel is injected at a timing so that the engine torque output is not influenced (e.g., expansion stroke) so as to achieve $\lambda \approx 1$ or $\lambda < 1$ and reduce $NO_x$ stored in the $NO_x$ catalyst 45. Hereinafter, such a control for reducing $NO_x$ stored in the $NO_x$ catalyst 45 is referred to as "$DeNO_x$ control." Note that "De" in the word "$DeNO_x$" is a prefix meaning separation or removal.

The PCM 60 is comprised of a processor 60A (e.g., a CPU (central processing unit)), various programs which are interpreted and executed by the processor 60A (including a basic control program, such as an OS, and an application program activated on the OS and realizing a specific function), and an internal memory such as ROM(s) and/or RAM(s), for storing programs and various data. The processor 60A is configured to execute at least a $NO_x$ reduction controlling module 60B to perform the $NO_x$ reduction control. This module is stored in the internal memory as one or more software programs.

<Fuel Injection Control>

Next, a fuel injection control of this embodiment is described with reference to the flowchart (fuel injection control process) of FIG. 3. This fuel injection control process is started when an ignition of the vehicle is turned on and the PCM 60 is powered on, and repeatedly executed at a given cycle.

First, at S101, the PCM 60 acquires an operating state of the vehicle. For example, the PCM 60 acquires at least the accelerator opening detected by the accelerator opening sensor 150, the vehicle speed detected by the vehicle speed sensor 151, the crank angle detected by the crank angle sensor 100, and a gear range currently set in a transmission of the vehicle.

Next, at S102, the PCM 60 sets a target acceleration based on the acquired operating state of the vehicle at S101. For example, the PCM 60 selects, from a plurality of acceleration characteristic maps (created in advance and stored in the memory) defined for various vehicle speeds and various gear ranges, an acceleration characteristic map corresponding to the current vehicle speed and gear range, and determines the target acceleration corresponding to the current accelerator opening by referring to the selected acceleration characteristic map.

Next, at S103, the PCM 60 determines a target torque of the engine E to achieve the target acceleration determined at S102. In this case, the PCM 60 determines the target torque within a range of torque which the engine E is possible to output, based on the current vehicle speed, the gear range, a current road surface inclination, a road surface $\mu$, etc.

Next, at S104, the PCM 60 calculates the fuel injection amount to be injected from the fuel injector 20 based on the target torque and the engine speed, so as to output the target torque from the engine E determined at S103. This fuel injection amount is applied in the main injection (main injection amount).

On the other hand, in parallel with the processes at S102 to S104, the PCM 60 sets a fuel injection pattern according to the operating state of the engine E at S105. For example, when executing the above $DeNO_x$ control, the PCM 60 sets a fuel injection pattern in which at least the post injection is performed in addition to the main injection. In this case, the PCM 60 also determines the fuel injection amount applied in the post injection (post injection amount) and the timing to perform the post injection (post injection timing etc.), of which details are described later.

Then, the process proceeds to S106 where the PCM 60 controls the fuel injector 20 based on the main injection amount calculated at S104 and the fuel injection pattern set at S105 (including the post injection amount and the post injection timing in the case where the post injection is performed). In other words, the PCM 60 controls the fuel injector 20 so that a desired amount of fuel is injected in a desired fuel injection pattern.

Here, a method of calculating the post injection amount applied in the $DeNO_x$ control (hereinafter, referred to as "$DeNO_x$ post injection amount") in this embodiment is described. The $DeNO_x$ post injection amount calculation is performed in parallel with the fuel injection control illustrated in FIG. 3. In other words, the $DeNO_x$ post injection amount is calculated as needed during the fuel injection control.

Figure 3:
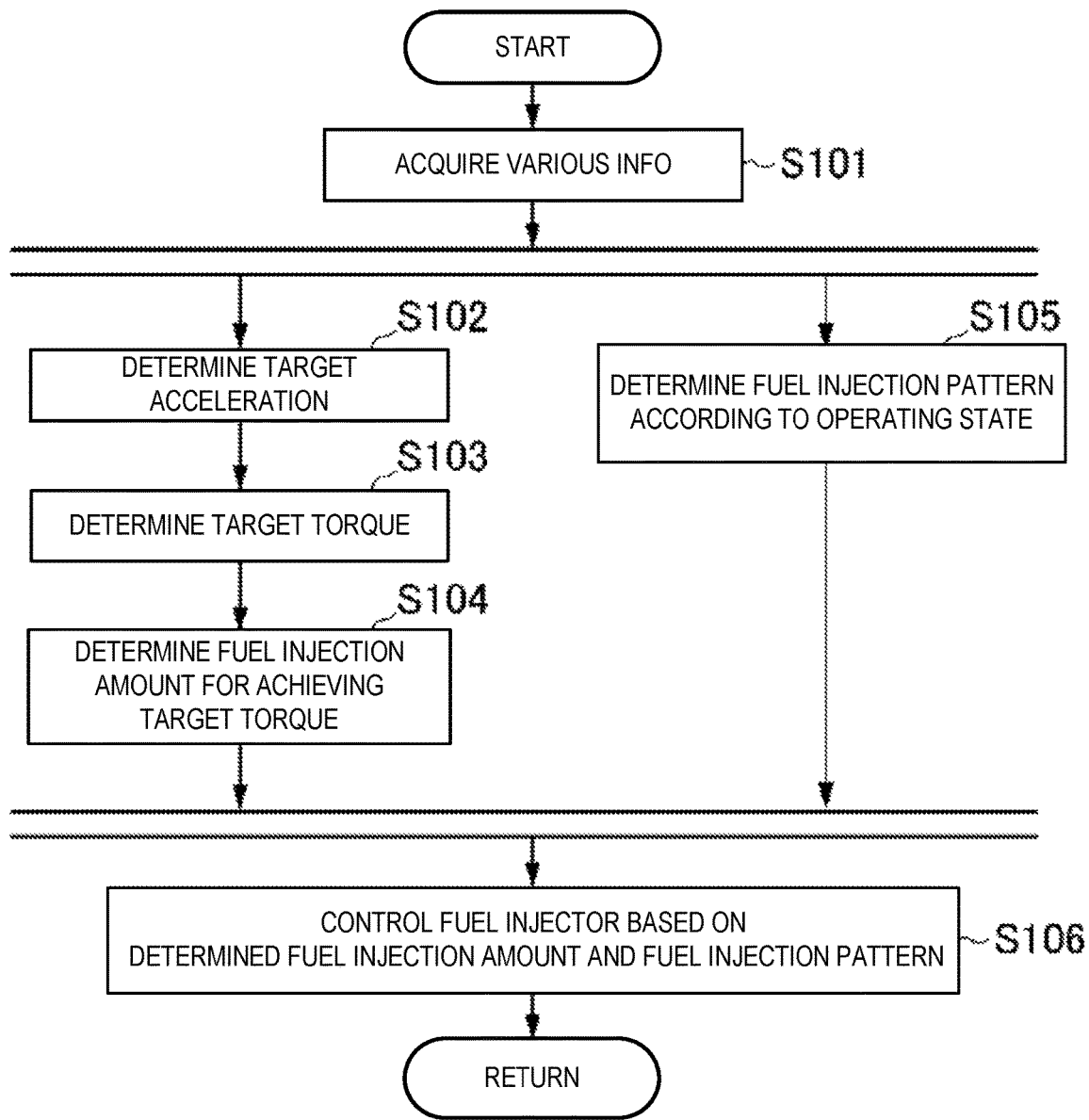
FIG. 3 is a flowchart illustrating a fuel injection control of the embodiment.

First, the PCM 60 at least acquires the intake air amount (fresh air amount) detected by the airflow sensor 101, the oxygen concentration within the exhaust gas (exhaust gas oxygen concentration) detected by the $O_2$ sensor 111, and the main injection amount calculated at S104 of FIG. 3. The PCM 60 also acquires an exhaust gas amount (EGR gas amount) recirculated to the intake system IN by the EGR device 43, which is obtained based on a given model, for example. Subsequently, the PCM 60 calculates an amount of air introduced into the engine E (i.e., charging amount) based on the acquired fresh air amount and the EGR gas amount, and calculates an oxygen concentration within the air introduced into the engine E based on this charging amount.

Next, the PCM 60 calculates the post injection amount ($DeNO_x$ post injection amount) required in the post injection, which is performed in addition to the main injection, to control the air-fuel ratio to the target air-fuel ratio (the air-fuel ratio approximately equal to or smaller than the theoretical air-fuel ratio) in order to reduce the $NO_x$ stored in the $NO_x$ catalyst 45. In other words, the PCM 60 determines the post injection amount required in addition to the main injection amount in order to bring the air-fuel ratio of the exhaust gas to the target air-fuel ratio. In this case, the PCM 60 calculates the $DeNO_x$ post injection amount in consideration of the difference between the oxygen concentration detected by the $O_2$ sensor 111 and the oxygen concentration calculated as described above. For example, based on the air-fuel ratio of the exhaust gas generated when the fuel injected in the main injection is combusted, the PCM 60 suitably performs feedback processing according to the difference between the detected oxygen concentration and the calculated oxygen concentration, and calculates the $DeNO_x$ post injection amount for controlling the air-fuel ratio to the target air-fuel ratio. By calculating the $DeNO_x$ post injection amount as described above, the air-fuel ratio is accurately controlled to the target air-fuel ratio by the post injection in the $DeNO_x$ control, and the $NO_x$ stored in the $NO_x$ catalyst 45 is reliably reduced.

<$DeNO_x$ Control>

Hereinafter, the $DeNO_x$ control of this embodiment is described in detail.

First, a basic concept of the $DeNO_x$ control of this embodiment is described. In this embodiment, when the $NO_x$ stored amount in the $NO_x$ catalyst 45 is above a given amount, typically when the $NO_x$ stored amount is approximately equal to a limit value (e.g., the capacity of the $NO_x$ catalyst 45), the PCM 60 executes a $DeNO_x$ control in which the fuel injector 20 is controlled to perform the post injection so that the air-fuel ratio is continuously controlled to the target air-fuel ratio, in order to reduce $NO_x$ stored in the $NO_x$ catalyst 45 to substantially zero (may suitably be referred to as "active $DeNO_x$ control"). In this manner, a large amount of $NO_x$ stored in the $NO_x$ catalyst 45 is forcibly reduced and the $NO_x$ purification performance of the $NO_x$ catalyst 45 is reliably secured.

Even if the $NO_x$ stored amount in the $NO_x$ catalyst 45 is below the given amount, when the air-fuel ratio becomes rich due to acceleration of the vehicle, the PCM 60 executes a $DeNO_x$ control in which the fuel injector 20 is controlled to perform the post injection so as to temporarily control the air-fuel ratio to the target air-fuel ratio, in order to reduce $NO_x$ stored in the $NO_x$ catalyst 45 (may suitably be referred to as "passive $DeNO_x$ control"). In the passive $DeNO_x$ control, the post injection is performed to control the air-fuel ratio to approximately equal to or smaller than the theoretical air-fuel ratio under a situation where the air-fuel ratio reduces due to the increase of the main injection amount, such as during acceleration of the vehicle. Therefore, the post injection amount for controlling the air-fuel ratio to the target air-fuel ratio is smaller compared to a case of executing the $DeNO_x$ control in a situation where the air-fuel ratio does not reduce (i.e., no acceleration). Moreover, since the passive $DeNO_x$ control is executed accompanying the acceleration of the vehicle, the frequency of executing this control is comparatively high.

In this embodiment, by applying such a passive $DeNO_x$ control, $DeNO_x$ is performed frequently while preventing a fuel consumption increase due to $DeNO_x$. Although the passive $DeNO_x$ control is executed only for a comparatively short period of time, since it is executed frequently, the $NO_x$ stored amount in the $NO_x$ catalyst 45 is efficiently reduced. As a result, the $NO_x$ stored amount in the $NO_x$ catalyst 45 does not easily exceed the given amount, therefore the execution frequency of the active $DeNO_x$ control which requires a larger amount of post injection amount than in the passive $DeNO_x$ control is lowered, thus it becomes possible to effectively prevent the fuel consumption increase due to $DeNO_x$.

Further in this embodiment, when executing the above active $DeNO_x$ control, the fuel injected in the post injection (hereinafter, referred to as "post-injected fuel") is combusted inside the cylinder of the engine E to control the air-fuel ratio to the target air-fuel ratio. Here, the PCM 60 performs the post injection at a timing so that the post-injected fuel is combusted inside the cylinder. For example, the PCM 60 sets a given timing in an early half of the expansion stroke of the engine E as the post injection timing of the active $DeNO_x$ control. By applying such a post injection timing of the active $DeNO_x$ control, it is possible to prevent discharge of the post-injected fuel as unburned fuel (i.e., HC) or oil dilution due to the post-injected fuel.

On the other hand, in this embodiment, when executing the passive $DeNO_x$ control, the PCM 60 controls the air-fuel ratio to the target air-fuel ratio by discharging the post-injected fuel as unburned fuel into the exhaust passage 41 without combusting it inside the cylinder of the engine E. In this case, the PCM 60 performs the post injection at a timing so that the post-injected fuel is discharged from the cylinder to the exhaust passage 41 as unburned fuel. For example, the PCM 60 sets a given timing in a latter half of the expansion stroke of the engine E as the post injection timing of the passive $DeNO_x$ control. By applying such a post injection timing of the passive $DeNO_x$ control, generation of smoke (soot) due to the post-injected fuel being combusted inside the cylinder is prevented.

Here, operating ranges of the engine E within which the passive $DeNO_x$ control and the active $DeNO_x$ control are executed in the embodiment are described with reference to FIG. 4 in which the horizontal axis shows engine speed and the vertical axis shows engine load. Further in FIG. 4, the curve L1 indicates a highest torque line of the engine E.

Figure 4:
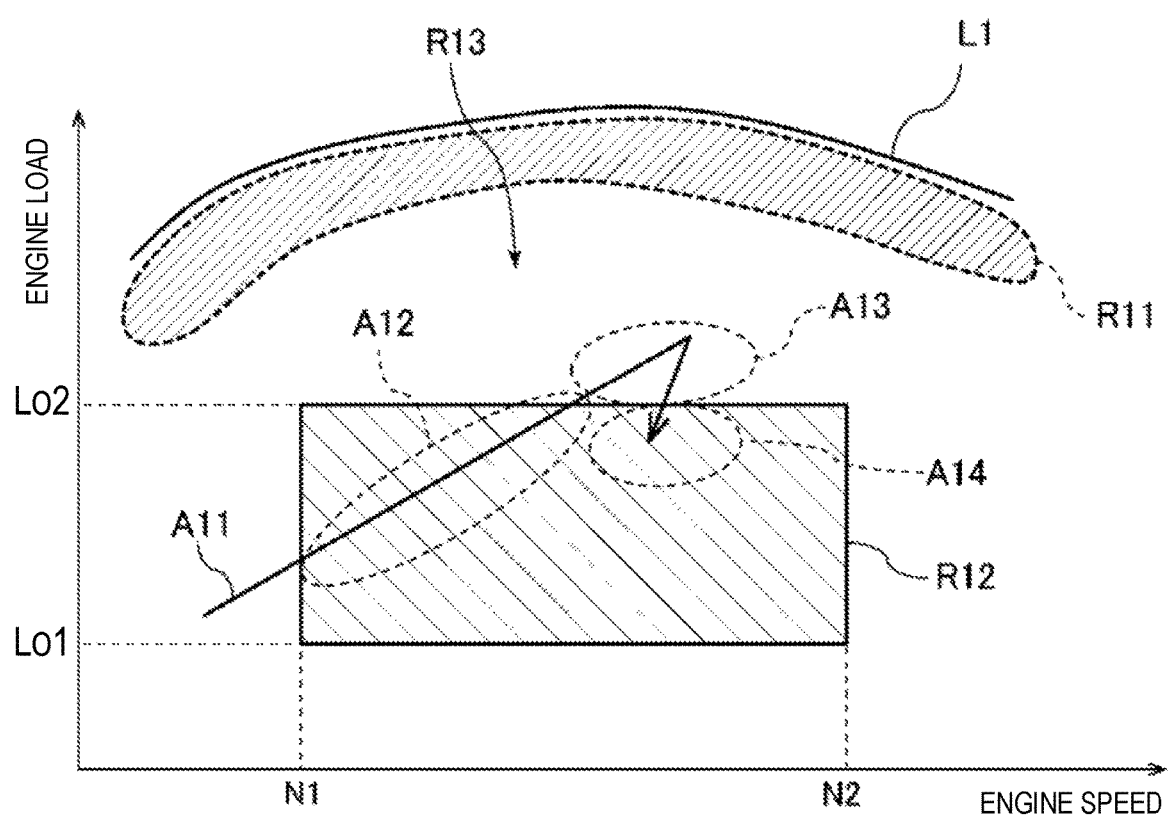
FIG. 4 is a chart illustrating operating ranges of the engine within which a passive $DeNO_x$ control and an active $DeNO_x$ control are performed, respectively, in the embodiment.

As illustrated in FIG. 4, in this embodiment, the PCM 60 executes the active $DeNO_x$ control when the engine load is within a medium load range equal to and higher than a first load Lo1 but lower than a second load Lo2 (>first load Lo1) and the engine speed is within a medium speed range equal to and higher than a first speed N1 but lower than a second speed N2 (>first speed N1), i.e., the engine load and the engine speed are within an operating range indicated by R12 (hereinafter, referred to as "active $DeNO_x$ execution range R12"). The active DeNO$_x$ execution range R12 is adopted because of the following reason.

As described above, in the case of executing the active DeNO$_x$ control, in view of preventing HC generation caused by the post-injected fuel being discharged as it is, oil dilution by the post-injected fuel, etc., the post injection is performed at the timing so that the fuel is combusted inside the cylinder. In this case, in this embodiment, when the post-injected fuel is combusted, the generation of smoke and also HC (i.e., discharge of unburned fuel due to incomplete combustion) is prevented. For example, the time for the post-injected fuel to combust is extended as long as possible, i.e., ignition is caused in a state where air and fuel are suitably mixed, so that the generation of smoke and HC is prevented. Therefore, in the active DeNO$_x$ control, a suitable amount of EGR gas is introduced to effectively delay the ignition of the post-injected fuel.

Note that the reason for preventing the HC generation during the active DeNO$_x$ control is to prevent that, in the case where the EGR gas is introduced as described above, HC also recirculates to the intake system IN as EGR gas and this HC serves as a binder to combine with soot and clog the gas passage. In addition, when the active DeNO$_x$ control is executed within an operating range within which the temperature of the NO$_x$ catalyst 45 is low and HC purification performance (purification performance of HC due to DOC in the NO$_x$ catalyst 45) is not secured, the HC generation reduction is performed to prevent the HC from being discharged without being purified. The active DeNO$_x$ execution range R12 also includes a range where the temperature of the NO$_x$ catalyst 45 is relatively low and thus cannot secure such HC purification performance. The reason for preventing smoke generation in the active DeNO$_x$ control is to prevent that, DPF regeneration for combusting and removing PM corresponding to smoke being captured by the DPF 46 (a control of performing post injection similar to the DeNO$_x$ control) is performed frequently and the fuel consumption increases.

Incidentally, when the engine load becomes high, since the air introduced into the engine E is reduced to achieve the target air-fuel ratio, the amount of oxygen required for suitable combustion of the post-injected fuel becomes insufficient, and smoke and HC tend to be generated. Especially, as the engine load increases, the in-cylinder temperature rises and the post-injected fuel is ignited without sufficient time from the post injection of the fuel, i.e., combustion occurs before air and fuel are properly mixed, which causes the generation of smoke and HC. On the other hand, within an operating range where the engine load is considerably low, the temperature of the NO$_x$ catalyst 45 is low and the NO$_x$ catalyst 45 does not perform the NO$_x$ reducing function sufficiently. In addition, within this range, the post-injected fuel does not suitably combust, i.e., a misfire occurs.

Although in the above description the phenomenon related to the engine load is described, the same phenomenon occurs with the engine speed.

Thus, in this embodiment, the operating range of the engine E corresponding to the medium load range and the medium speed range is adopted as the active DeNO$_x$ execution range R12 where the active DeNO$_x$ control is executed. In other words, in this embodiment, the active DeNO$_x$ control is executed only within the active DeNO$_x$ execution range R12 and is prohibited outside the active DeNO$_x$ execution range R12. Within the operating range where the active DeNO$_x$ control is prohibited, especially where the engine load or the engine speed is higher than within the active DeNO$_x$ execution range R12 (the range assigned with the reference character "R13"), since the NO$_x$ purification performance of the SCR catalyst 47 is sufficient, the SCR catalyst 47 purifies NOR, and the discharge of NO$_x$ from the vehicle is prevented without executing the DeNO$_x$ control.

Further in this embodiment, within a range where the engine load is higher than the range R13 where the SCR catalyst 47 purifies NO$_x$ (the range assigned with the reference character "R11," hereinafter referred to as "passive DeNO$_x$ execution range R11"), since the amount of exhaust gas increases and the SCR catalyst 47 cannot purify all NOR, the passive DeNO$_x$ control is executed. In this passive DeNO$_x$ control, as described above, the post injection is performed at the timing so that the post-injected fuel is discharged from the cylinder to the exhaust passage 41 as unburned fuel. Within the passive DeNO$_x$ execution range R11, since the temperature of the NO$_x$ catalyst 45 is sufficiently high and suitable purification performance of HC (HC purification performance of the DOC in the NO$_x$ catalyst 45) is secured, the NO$_x$ catalyst 45 properly purifies the unburned fuel discharged as described above.

Note that if the post-injected fuel is combusted inside the cylinder in the passive DeNO$_x$ control as in the active DeNO$_x$ control, smoke is generated. The reason for this is similar to the reason for prohibiting execution of the active DeNO$_x$ control when the engine load becomes high. Therefore, in the passive DeNO$_x$ control, the post-injected fuel is discharged from the cylinder to the exhaust passage 41 as unburned fuel.

Here, a specific example of the active DeNO$_x$ control when the operating state of the engine changes as indicated by the arrow All in FIG. 4 is described. First, when the operating state of the engine enters the active DeNO$_x$ execution range R12 (see the area indicated by the reference character "A12"), the PCM 60 executes the active DeNO$_x$ control. Then, when the operating state of the engine reaches outside the active DeNO$_x$ execution range R12 (see the area indicated by the reference character "A13"), the PCM 60 suspends the active DeNO$_x$ control, and the SCR catalyst 47 purifies NOR. When the operating state of the engine re-enters the active DeNO$_x$ execution range R12 (see the area indicated by the reference character "A14"), the PCM 60 resumes the active DeNO$_x$ control. In this manner, the active DeNO$_x$ control is carried on until NO$_x$ stored in the NO$_x$ catalyst 45 drops almost down to zero.

Next, the temperature ranges within which the passive DeNO$_x$ control and the active DeNO$_x$ control are executed in the embodiment are described with reference to FIG. 5 which illustrates a relationship between the catalyst temperature (horizontal axis) and an exhaust gas purification rate (vertical axis).

Specifically, the graph G11 indicates the relationship between the temperature of the NO$_x$ catalyst 45 (hereinafter, referred to as "NO$_x$ catalyst temperature") and the NO$_x$ purification rate of the NO$_x$ catalyst 45. The graph G12 indicates the relationship between the temperature of the SCR catalyst 47 (hereinafter, referred to as "SCR temperature") and an NO$_x$ purification rate of the SCR catalyst 47. The range indicated by the reference character R21 indicates a temperature range where a higher NO$_x$ purification rate than a given value is obtainable by the NO$_x$ catalyst 45, according to the NO$_x$ purification characteristic of the NO$_x$ catalyst 45 illustrated in the graph G11. The range indicated by the reference character R22 indicates a temperature range where a higher NO$_x$ purification rate than a given value is obtainable by the SCR catalyst 47, according to the NO$_x$ purification characteristic of the SCR catalyst 47 illustrated in the graph G12. The latter temperature range R22 is defined by a temperature T11 of the SCR catalyst 47. This temperature T11 is at least within an active temperature range of the SCR catalyst 47 and for example, corresponds to a lowest value within the temperature range R22 where the higher $NO_x$ purification rate than the given value is obtainable by the SCR catalyst 47. Hereinafter, the temperature T11 is suitably referred to as "SCR determination temperature."

Figure 5:
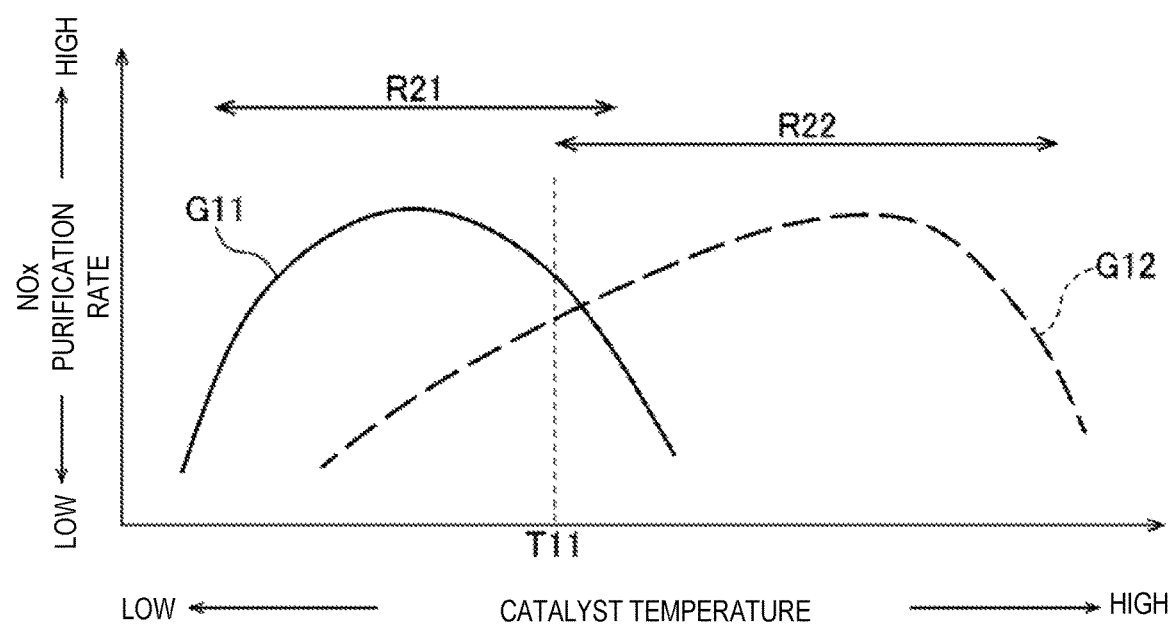
FIG. 5 is a view illustrating relationships of temperatures of a $NO_x$ catalyst and a SCR catalyst with an exhaust gas purification rate.

As illustrated in FIG. 5, the $NO_x$ catalyst 45 exerts high $NO_x$ purification performance within a comparatively low temperature range, and the SCR catalyst 47 exerts high $NO_x$ purification performance within a comparatively high temperature range. Therefore, $NO_x$ within the exhaust gas is preferably purified by the $NO_x$ catalyst 45 when the temperature of the exhaust gas is comparatively low, and preferably purified by the SCR catalyst 47 when the temperature of the exhaust gas comparatively high. Therefore, in this embodiment, the PCM 60 typically executes the passive $DeNO_x$ control and the active $DeNO_x$ control only when the SCR temperature is below the SCR determination temperature. If the SCR temperature is above the SCR determination temperature, executions of the passive $DeNO_x$ control and the active $DeNO_x$ control are prohibited. The reason for the prohibition is that since the SCR catalyst 47 suitably purifies $NO_x$ within the exhaust gas when the SCR temperature is above the SCR determination temperature, the $DeNO_x$ control is not particularly needed to secure the $NO_x$ purification performance of the $NO_x$ catalyst 45. Therefore, when the SCR temperature is above the SCR determination temperature, execution of the $DeNO_x$ control is typically prohibited to prevent the fuel consumption increase.

Hereinafter, the active $DeNO_x$ control and the passive $DeNO_x$ control of this embodiment are described in detail.

Figure 6:
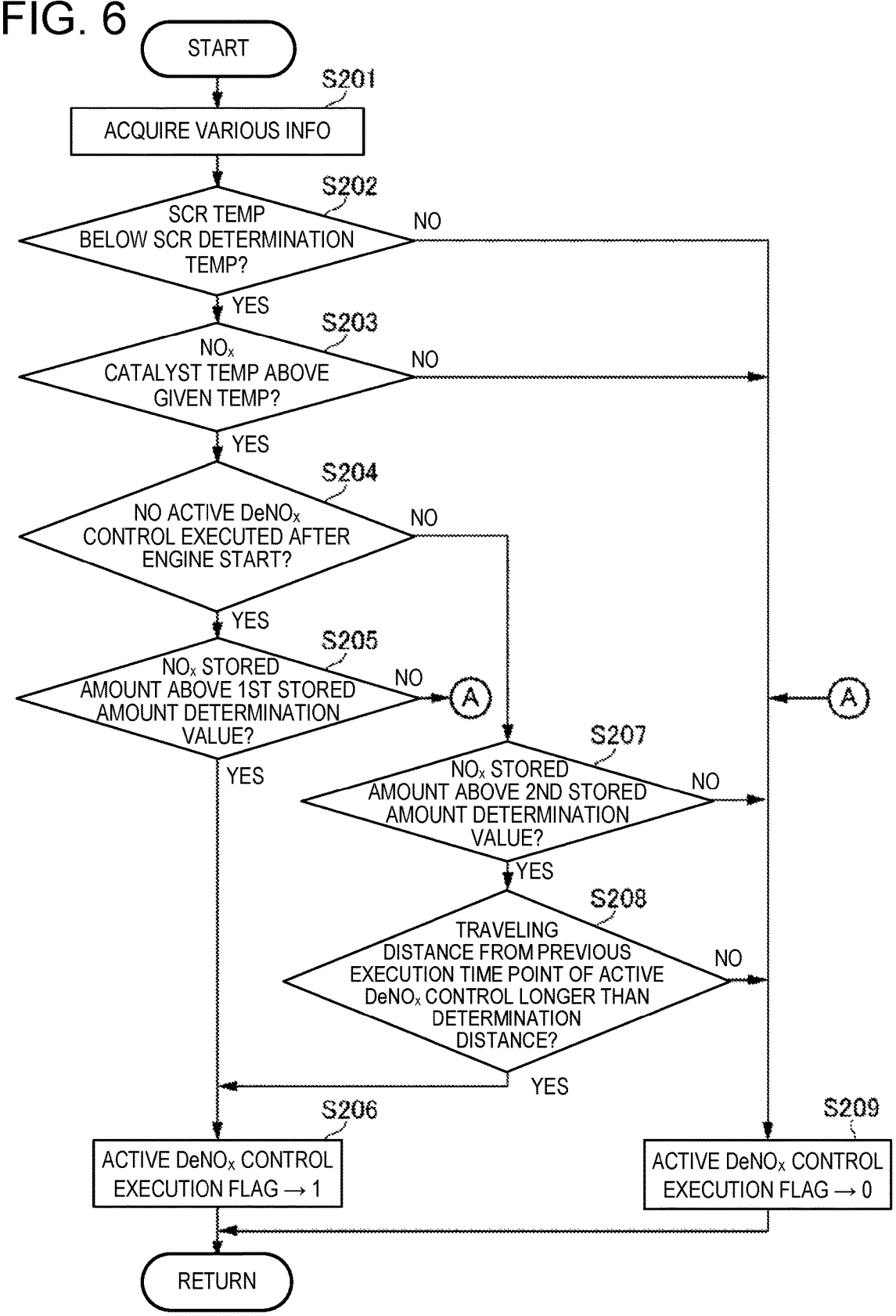
FIG. 6 is a flowchart illustrating setting of an active $DeNO_x$ control execution flag of the embodiment.

First, setting of an active $DeNO_x$ control execution flag which is for determining whether to execute the active $DeNO_x$ control in this embodiment is described with reference to the flowchart (active $DeNO_x$ control execution flag setting process) of FIG. 6. The PCM 60 repeatedly executes this active $DeNO_x$ control execution flag setting process at a given cycle in parallel with the fuel injection control process illustrated in FIG. 3.

First, at S201, the PCM 60 acquires various information of the vehicle. For example, the PCM 60 acquires at least an $NO_x$ catalyst temperature, the SCR temperature, and the $NO_x$ stored amount in the $NO_x$ catalyst 45. Here, the $NO_x$ catalyst temperature is estimated, for example, based on the temperature detected by the temperature sensor 112 disposed immediately upstream of the $NO_x$ catalyst 45 (the temperature detected by the temperature sensor 113 disposed between the $NO_x$ catalyst 45 and the DPF 46 may also be used). The SCR temperature is estimated based on, for example, the temperature detected by the temperature sensor 117 disposed immediately upstream of the SCR catalyst 47. The $NO_x$ stored amount is obtained by estimating the amounts of $NO_x$ within the exhaust gas based on the operating state of the engine E, the flow rate of the exhaust gas, the temperature of the exhaust gas, etc., and integrating the $NO_x$ amounts.

Next, at S202, the PCM 60 determines whether the SCR temperature acquired at S201 is below an SCR determination temperature. If the SCR temperature is below the SCR determination temperature (S202: YES), the process proceeds to S203. On the other hand, if the SCR temperature is above the SCR determination temperature (S202: NO), the process proceeds to S209. In this case, since the SCR catalyst 47 suitably purifies $NO_x$ within the exhaust gas, the PCM 60 sets the active $DeNO_x$ control execution flag to "0" to prohibit execution of the active $DeNO_x$ control (S209). Then, the process ends.

At S203, the PCM 60 determines whether the $NO_x$ catalyst temperature acquired at S201 is above a given temperature. When the $NO_x$ catalyst temperature is low, even if the air-fuel ratio is controlled to the target air-fuel ratio, the $NO_x$ catalyst 45 hardly reduces the stored NOR. Therefore, at S203, whether the $NO_x$ stored in the $NO_x$ catalyst 45 is reducible is determined. The given temperature used in the determination of S203 is set based on the NOR catalyst temperature at which the $NO_x$ stored in the $NO_x$ catalyst 45 is reducible. If the NOR catalyst temperature is above the given temperature (S203: YES), the process proceeds to S204. On the other hand, if the $NO_x$ catalyst temperature is below the given temperature (S203: NO), the process proceeds to S209. In this case, the PCM 60 sets the active $DeNO_x$ control execution flag to "0" to prohibit execution of the active $DeNO_x$ control (S209).

At S204, the PCM 60 determines whether the active $DeNO_x$ control has been executed even once after an engine start. The determination of S204 is performed so that if the active $DeNO_x$ control has not been executed after the engine start, the execution condition of the active $DeNO_x$ control is loosened than in the case where the active $DeNO_x$ control has been executed, so as to preferentially execute the active $DeNO_x$ control. For example, if the active $DeNO_x$ control has been executed, the execution condition of S207 and the execution condition of S208, which are comparatively strict, are used, whereas if the active $DeNO_x$ control has not been executed, only the execution condition of S205 which is comparatively loose is used (these are described later in detail). If the active $DeNO_x$ control has not been executed (S204: YES), the process proceeds to S205.

At S205, the PCM 60 determines whether the $NO_x$ stored amount acquired at S201 is above a first stored amount determination value. For example, the first stored amount determination value is set to a value somewhat lower than the limit value of the $NO_x$ stored amount. If the $NO_x$ stored amount is above the first stored amount determination value (S205: YES), the process proceeds to S206. In this case, the PCM 60 sets the active $DeNO_x$ control execution flag to "1" to permit execution of the active $DeNO_x$ control (S206). In this manner, by executing the active $DeNO_x$ control after the engine start to somewhat forcibly reduce the $NO_x$ stored in the $NO_x$ catalyst 45, the $NO_x$ purification performance of the $NO_x$ catalyst 45 is reliably secured. On the other hand, when the $NO_x$ stored amount is smaller than the first stored amount determination value (S205: NO), the process proceeds to S209. In this case, the PCM 60 sets the active $DeNO_x$ control execution flag to "0" to prohibit unnecessary execution of the active $DeNO_x$ control (S209). Then, the process ends.

On the other hand, if the active $DeNO_x$ control has been executed after the engine start (S204: NO), the process proceeds to S207 where the PCM 60 determines whether the $NO_x$ stored amount acquired at S201 is above a second stored amount determination value. The second stored amount determination value is applied as a value at least higher than the first stored amount determination value, for example, the second stored amount determination value is set to a value close to (such as two-third of) the limit value of the $NO_x$ stored amount. If the $NO_x$ stored amount is above the second stored amount determination value (S207: YES), the process proceeds to S208. On the other hand, if the $NO_x$ stored amount is smaller than the second stored amount determination value (S207: NO), the process proceeds to S209. In this case, the PCM 60 sets the active $DeNO_x$ control execution flag to "0" to prohibit unnecessary execution of the active DeNO$_x$ control (S209). Then, the process ends.

At S208, the PCM 60 determines whether a traveling distance of the vehicle from the previous execution time point of the active DeNO$_x$ control is longer than a given determination distance. If this traveling distance is longer than the determination distance (S208: YES), the process proceeds to S206. In this case, the PCM 60 sets the active DeNO$_x$ control execution flag to "1" to permit execution of the active DeNO$_x$ control (S206). By doing so, the active DeNO$_x$ control is executed to forcibly reduce a large amount of NO$_x$ stored in the NO$_x$ catalyst 45, thus the NO$_x$ purification performance of the NO$_x$ catalyst 45 is reliably secured. On the other hand, if the traveling distance is less than the determination distance (S208: NO), the process proceeds to S209. In this case, the PCM 60 sets the active DeNO$_x$ control execution flag to "0" to prohibit execution of the active DeNO$_x$ control (S209). Then, the process ends.

When the active DeNO$_x$ control is executed in a situation where the traveling distance from the previous execution time point of the active DeNO$_x$ control is short (i.e., the execution interval of the active DeNO$_x$ control is short), the possibility of oil dilution due to the post injection occurring becomes high. Therefore, in this embodiment, when this traveling distance is shorter than the determination distance (S208: NO), execution of the active DeNO$_x$ control is prohibited and oil dilution due to the post injection in the active DeNO$_x$ control is prevented. On the other hand, if the traveling distance from the previous execution time point of the active DeNO$_x$ control is long (i.e. the execution interval of the active DeNO$_x$ control is long), even if the active DeNO$_x$ control is to be executed, the possibility of oil dilution occurring due to the post injection is low. Therefore, in this embodiment, when the traveling distance from the previous execution time point of the active DeNO$_x$ control is longer than the determination distance (S208: YES), execution of the active DeNO$_x$ control is permitted.

Further in this embodiment, in consideration of progression in vaporization of post-injected fuel and oil dilution being less likely to occur as the in-cylinder temperature rises, the determination distance used at S208 is set small as the in-cylinder temperature rises to loosen the limitation on the control corresponding to the traveling distance from the previous execution time point of the active DeNO$_x$ control.

Figure 7:
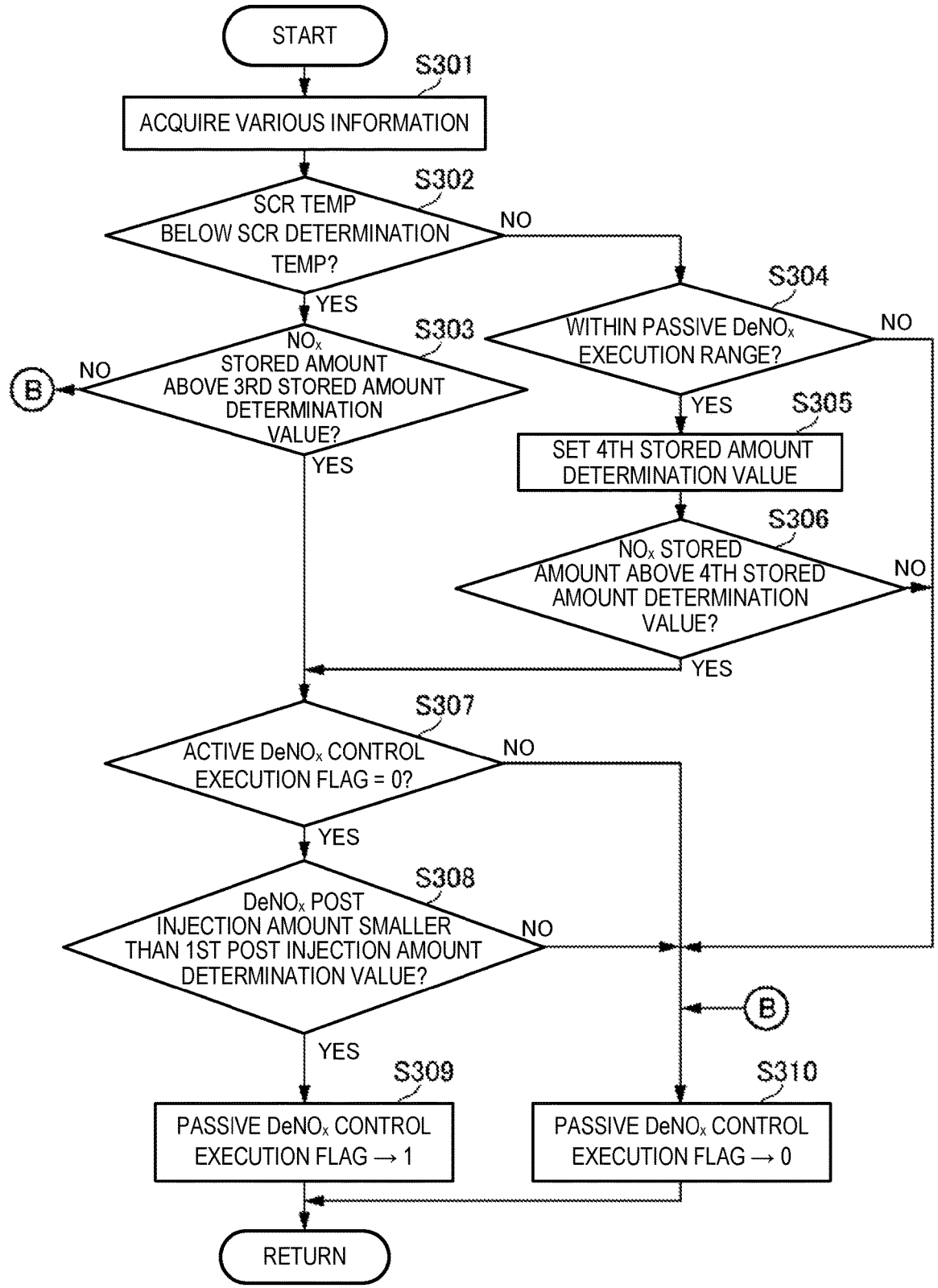
FIG. 7 is a flowchart illustrating setting of a passive $DeNO_x$ control execution flag of the embodiment.

Next, setting of a passive DeNO$_x$ control execution flag which is for determining whether to execute the passive DeNO$_x$ control in this embodiment is described with reference to the flowchart (passive DeNO$_x$ control execution flag setting process) of FIG. 7. The PCM 60 repeatedly executes this passive DeNO$_x$ control execution flag setting process at a given cycle in parallel with the fuel injection control process illustrated in FIG. 3 and the active DeNO$_x$ control execution flag setting process illustrated in FIG. 6.

First, at S301, the PCM 60 acquires various information of the vehicle. For example, the PCM 60 acquires at least the engine load, the engine speed, the NO$_x$ catalyst temperature, the SCR temperature, the target torque determined in the fuel injection control process illustrated in FIG. 3, the DeNO$_x$ post injection amount calculated as described above, the NO$_x$ stored amount in the NO$_x$ catalyst 45, and the value of the active DeNO$_x$ control execution flag set in the active DeNO$_x$ control execution flag setting process illustrated in FIG. 6. Note that the method of obtaining the NO$_x$ catalyst temperature, the SCR temperature, and the NO$_x$ stored amount is as described above.

Next, at S302, the PCM 60 determines whether the SCR temperature acquired at S301 is below the SCR determination temperature. If the SCR temperature is below the SCR determination temperature (S302: YES), the process proceeds to S303. In this case, since the SCR catalyst 47 is not active, whether to execute the passive DeNO$_x$ control to secure suitable NO$_x$ purification performance of the NO$_x$ catalyst 45 when performing the NO$_x$ purification by the NO$_x$ catalyst 45 is determined using various conditions described later.

At S303, whether the NO$_x$ stored amount acquired at S301 is above a third stored amount determination value. For example, the third stored amount determination value is set to a value of about one-third of the limit value of the NO$_x$ stored amount. If the NO$_x$ stored amount is above the third stored amount determination value (S303: YES), the process proceeds to S307. In this case, whether to execute the passive DeNO$_x$ control to lower the NO$_x$ stored amount to below the third stored amount determination value so as to secure the NO$_x$ purification performance of the NO$_x$ catalyst 45 is determined further using a condition described later. On the other hand, if the NO$_x$ stored amount is below the third stored amount determination value (S303: NO), the process proceeds to S310. In this case, since the NO$_x$ stored amount is comparatively small, the PCM 60 sets the passive DeNO$_x$ control execution flag to "0" (S310) so as to prohibit unnecessary execution of the passive DeNO$_x$ control and prevent the fuel consumption increase caused by the passive DeNO$_x$ control. Then, the process ends.

On the other hand, if the SCR temperature is above the SCR determination temperature (S302: NO), the process proceeds to S304 where the PCM 60 determines whether the operating state of the engine (engine load and engine speed) is within the passive DeNO$_x$ execution range R11 (see FIG. 4). This determination is typically equivalent to determining whether the operating state of the engine is within an operating range where the engine speed and load are high. If the operating state of the engine is within the passive DeNO$_x$ execution range R11 (S304: YES), the process proceeds to S305.

On the other hand, if the operating state of the engine is not included in the passive DeNO$_x$ execution range R11 (S304: NO), the process proceeds to S310. Since the passive DeNO$_x$ control is not to be executed, the SCR temperature is above the SCR determination temperature, and the exhaust gas flow rate is comparatively low and NO$_x$ is suitably purified by the SCR catalyst 47 in this case, the PCM 60 sets the passive DeNO$_x$ control execution flag to "0" (S310). Then, the process ends.

Next, at S305, the PCM 60 sets a fourth stored amount determination value for further determination of the NO$_x$ stored amount based on the exhaust gas flow rate. For example, the PCM 60 estimates the exhaust gas flow rate based on the intake air amount detected by the airflow sensor 101, the fuel injection amount from the fuel injection valve 20, etc., and sets the fourth stored amount determination value based on the exhaust gas flow rate. Next, a method of setting the fourth stored amount determination value is described in detail with reference to FIG. 8.

Figure 8:
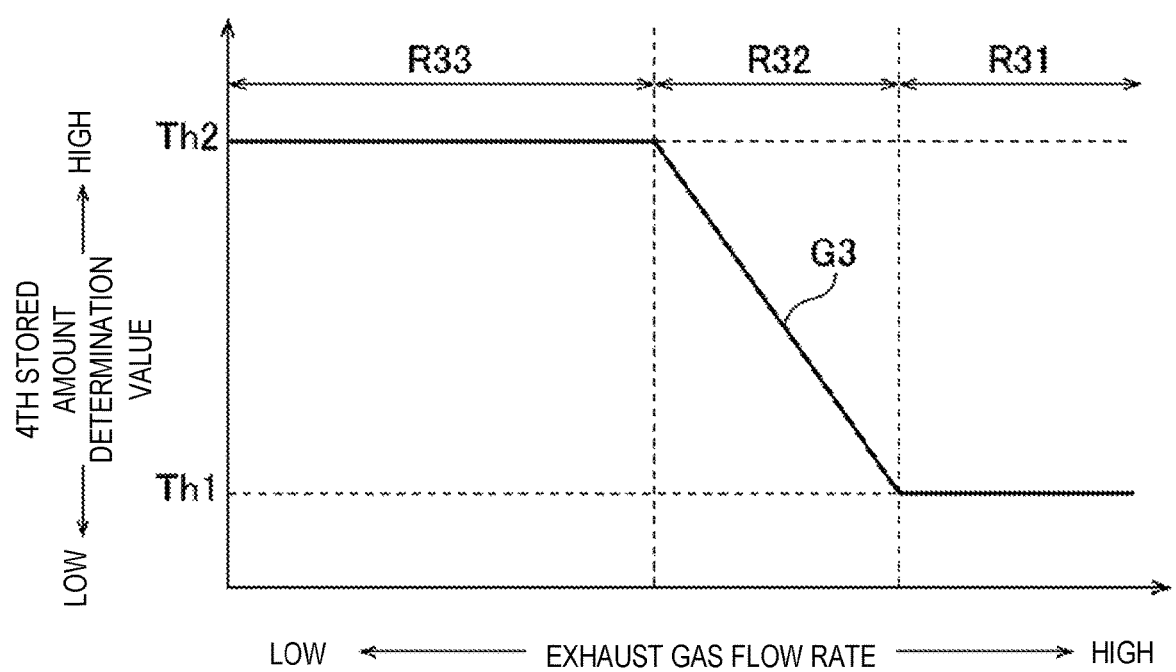
FIG. 8 is a view illustrating a setting method of a fourth stored amount determination value of the embodiment.

In FIG. 8, the horizontal axis indicates the exhaust gas flow rate and the vertical axis indicates the fourth stored amount determination value. Typically, the passive DeNO$_x$ control execution flag is set to "1" to permit the execution of the passive DeNO$_x$ control when the NO$_x$ stored amount is above the fourth stored amount determination value. Therefore, execution of the passive DeNO$_x$ control is more likely to be permitted as the fourth stored amount determination value in the vertical axis decreases.

The graph G3 in FIG. 8 indicates the fourth stored amount determination value to be set according to the exhaust gas flow rate. This graph G3 corresponds to a map defining the fourth stored amount determination value to be set according to the exhaust gas flow rate. As indicated by the graph G3, in this embodiment, the fourth stored amount determination value is set to have a smaller value as the exhaust gas flow rate increases. For example, within the range R31 where the exhaust gas flow rate is comparatively high, a comparatively low fourth stored amount determination value Th1 is set, and within the range R33 where the exhaust gas flow rate is comparatively small, a comparatively high fourth stored amount determination value Th2 is set. Within the range R32 between the range R31 and the range R33, the fourth stored amount determination value is set to change between Th1 and Th2 according to the exhaust gas flow rate. For example, a value of approximately 0 is applied to the fourth stored amount determination value Th1 (corresponding to the $NO_x$ stored amount being approximately 0), and a value near the limit value of the $NO_x$ stored amount is applied to the fourth stored amount determination value Th2. The third stored amount determination value used at S303 is a value between these Th1 and Th2.

The fourth stored amount determination value set in this manner corresponds to a target value of the $NO_x$ stored amount for reducing the $NO_x$ stored amount by executing the passive $DeNO_x$ control. In this embodiment, by setting the fourth stored amount determination value corresponding to the exhaust gas flow rate and determining whether to execute the passive $DeNO_x$ control using the fourth stored amount determination value, the passive $DeNO_x$ control is executed and thus the $NO_x$ stored amount is controlled.

More specifically, within the range R31 where the exhaust gas flow rate is comparatively high, since the SCR catalyst 47 hardly exerts its $NO_x$ purification function, the passive $DeNO_x$ control is executed to reduce the $NO_x$ stored amount to the comparatively small fourth stored amount determination value Th1 (e.g., approximately 0) so as to surely secure the $NO_x$ purification performance of the $NO_x$ catalyst 45. Within the range R32 where the exhaust gas flow rate is lower than within the range R31, although the SCR catalyst 47 somewhat exerts the $NO_x$ purification function, since the $NO_x$ purification function of the SCR catalyst 47 degrades here, the passive $DeNO_x$ control is executed so as to secure the $NO_x$ purification performance of the $NO_x$ catalyst 45 in order to suitably reduce the $NO_x$ stored amount of the $NO_x$ catalyst 45 according to the exerted level of the $NO_x$ purification function of the SCR catalyst 47 (specifically, in order to lower the $NO_x$ stored amount as the exhaust gas flow rate increases).

On the other hand, within the range R33 where the exhaust gas flow rate is further lower than within the range R32, since the SCR catalyst 47 sufficiently exerts the $NO_x$ purification function, the passive $DeNO_x$ control may not be executed, i.e., the $NO_x$ stored amount of the $NO_x$ catalyst 45 is not required to be reduced. Therefore, within the range R33, a comparatively high fourth stored amount determination value Th2 is applied so that execution of the passive $DeNO_x$ control is not permitted (e.g., a value near the limit value of the $NO_x$ stored amount).

Returning to FIG. 7, the processing after S306 is described. At S306, the PCM 60 determines whether the $NO_x$ stored amount acquired at S301 is above the fourth stored amount determination value set at S305 described above. If the $NO_x$ stored amount is above the fourth stored amount determination value (S306: YES), the process proceeds to S307. In this case, whether to execute the passive $DeNO_x$ control so to reduce the $NO_x$ stored amount to below the fourth stored amount determination value in order to secure the $NO_x$ purification performance of the $NO_x$ catalyst 45 is determined using a condition described later. On the other hand, if the $NO_x$ stored amount is below the fourth stored amount determination value (S306: NO), the process proceeds to S310. In this case, since it is not required to execute the passive $DeNO_x$ control to lower the $NO_x$ stored amount of the $NO_x$ catalyst 45, the passive $DeNO_x$ control execution flag is set to "0" (S310). Then, the process ends.

At S307, the PCM 60 determines whether the active $DeNO_x$ control execution flag acquired at S301 is "0." In other words, the PCM 60 determines whether to execute the active $DeNO_x$ control. If the active $DeNO_x$ control execution flag is "0" (S307: YES), the process proceeds to S308. On the other hand, if the active $DeNO_x$ control execution flag is not "0," i.e., if it is "1" (S307: NO), the process proceeds to S310. In this case, the PCM 60 sets the passive $DeNO_x$ control execution flag to "0" to prohibit execution of the passive $DeNO_x$ control and preferentially execute the active $DeNO_x$ control (S310). In other words, even if the execution condition of the passive $DeNO_x$ control is satisfied, when the execution condition of the active $DeNO_x$ control is satisfied, the active $DeNO_x$ control is preferentially executed. Then, the process ends.

At S308, the PCM 60 determines whether the $DeNO_x$ post injection amount acquired at S301 is smaller than a first post injection amount determination value. In other words, whether the air-fuel ratio drops to a given value on the rich side in the current situation, i.e., whether the vehicle is in a given acceleration state. In this manner, whether the $DeNO_x$ control is executable while preventing the fuel consumption increase as much as possible is determined and whether there is a possibility of oil dilution occurring due to the post injection is determined. The first post injection amount determination value to be applied for the determination at S308 is set in view of the above.

If the $DeNO_x$ post injection amount is smaller than the first post injection amount determination value (S308: YES), the process proceeds to S309. In this case, the various conditions described above are all satisfied, the PCM 60 sets the passive $DeNO_x$ control execution flag to "1" to permit execution of the passive $DeNO_x$ control (S309). Then, the process ends. On the other hand, if the $DeNO_x$ post injection amount is above the first post injection amount determination value (S308: NO), the process proceeds to S310. In this case, the PCM 60 sets the passive $DeNO_x$ control execution flag to "0" to prohibit execution of the passive $DeNO_x$ control and prevent the fuel consumption increase and oil dilution (S310). Then, the process ends.

Figure 9:
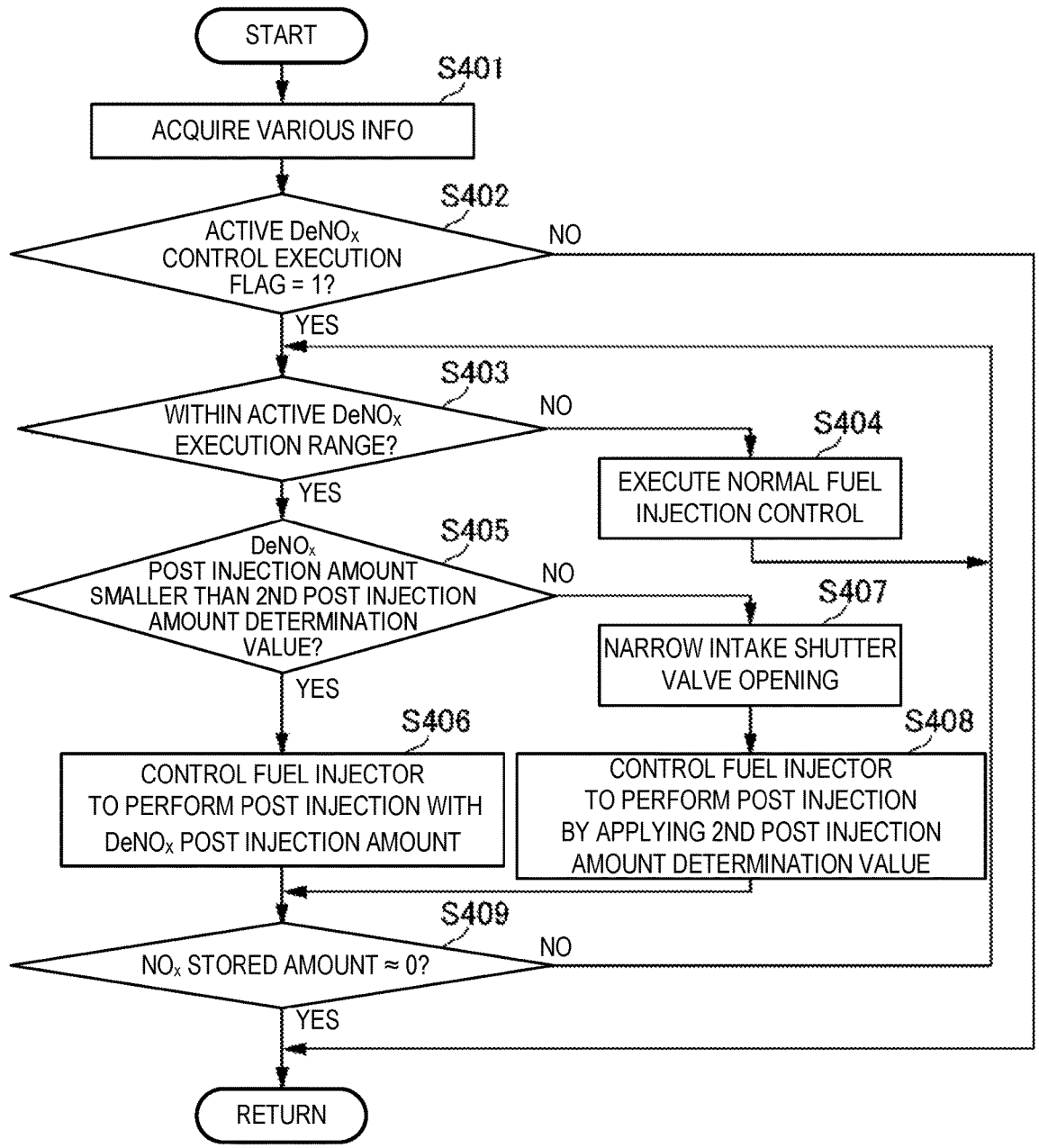
FIG. 9 is a flowchart illustrating the active $DeNO_x$ control of the embodiment.

Next, the active $DeNO_x$ control of this embodiment executed based on the active $DeNO_x$ control execution flag set as described above is described with reference to the flowchart (active $DeNO_x$ control process) of FIG. 9. The PCM 60 repeatedly executes this active $DeNO_x$ control process at a given cycle in parallel with the fuel injection control process illustrated in FIG. 3, the active $DeNO_x$ control execution flag setting process illustrated in FIG. 6, etc.

First, at S401, the PCM 60 acquires various information of the vehicle. For example, the PCM 60 at least acquires the engine load, the engine speed, the $NO_x$ catalyst temperature, the $DeNO_x$ post-injection amount calculated as described above, and the value of the active $DeNO_x$ control execution flag set in the active $DeNO_x$ control execution flag setting process illustrated in FIG. 6.

Next, at S402, the PCM 60 determines whether the active DeNO$_x$ control execution flag acquired at S401 is "1." In other words, the PCM 60 determines whether the active DeNO$_x$ control is to be executed. If the active DeNO$_x$ control execution flag is "1" (S402: YES), the process proceeds to S403. On the other hand, if the active DeNO$_x$ control execution flag is "0" (S402: NO), the process is terminated without executing the active DeNO$_x$ control.

At S403, the PCM 60 determines whether the operating state of the engine (engine load and engine speed) is within the active DeNO$_x$ execution range R12 (see FIG. 4). If the operating state of the engine is within the active DeNO$_x$ execution range R12 (S403: YES), the process proceeds to S405. On the other hand, if the operating state of the engine is outside the active DeNO$_x$ execution range R12 (S403: NO), the process proceeds to S404.

At S404, without executing the active DeNO$_x$ control, i.e., without executing the fuel injection control which includes the post injection for controlling the air-fuel ratio to the target air-fuel ratio, the PCM 60 executes a normal fuel injection control which does not include the post injection. Typically, the PCM 60 only executes the control for causing the main injection with the fuel injection amount corresponding to the target torque. The PCM 60 actually executes the processing of S404, at S106 of the fuel injection control process illustrated in FIG. 3. Then, the process returns to S403 to perform the determination again. In other words, if the active DeNO$_x$ control execution flag is "1," the PCM 60 executes the normal fuel injection control while the operating state of the engine remains outside the active DeNO$_x$ execution range R12. When the operation state enters the active DeNO$_x$ execution range R12, the PCM 60 switches the control from the normal fuel injection control to the fuel injection control in the active DeNO$_x$ control. For example, when the operating state of the engine deviates from the active DeNO$_x$ execution range R12 during the fuel injection control in the active DeNO$_x$ control, the PCM 60 suspends the fuel injection control process and executes the normal fuel injection control. Then, when the operating state enters the active DeNO$_x$ execution range R12, the PCM 60 resumes the fuel injection control process in the active DeNO$_x$ control.

Next, at S405, the PCM 60 determines whether the DeNO$_x$ post injection amount acquired at S401 is smaller than a second post injection amount determination value. The second post injection amount determination value is set larger than the first post injection amount determination value (see S308 in FIG. 7). Thus, it is possible to achieve a larger post injection amount in the active DeNO$_x$ control than in the passive DeNO$_x$ control, and the air-fuel ratio becomes controllable to the target air-fuel ratio regardless of the operating state of the engine E (e.g., even if it is not in a state where the air-fuel ratio reduces, such as during acceleration).

If the DeNO$_x$ post injection amount is smaller than the second post injection amount determination value (S405: YES), the process proceeds to S406 where the PCM 60 controls the fuel injector 20 to perform the post injection with the DeNO$_x$ post injection amount acquired at S401. The PCM 60 actually performs the processing of S406 at S106 of the fuel injection control process illustrated in FIG. 3. Then the process proceeds to S409.

On the other hand, if the DeNO$_x$ post injection amount is above the second post injection amount determination value (S405: NO), the process proceeds to S407. At S407, the PCM 60 reduces the oxygen concentration of air introduced into the engine E so as to control the air-fuel ratio to the target air-fuel ratio by using the post injection amount which is below the second post injection amount determination value (specifically, the second post injection amount determination value itself is applied as the DeNO$_x$ post injection amount). In this case, the PCM 60 executes at least one of a control for narrowing the opening of the intake shutter valve 7, a control for increasing the EGR gas amount, and a control for lowering the turbocharging pressure by the turbocharger 5, so as to reduce the oxygen concentration of the air introduced into the engine E, i.e., reduce the charging amount. For example, the PCM 60 obtains the turbocharging pressure required for controlling the air-fuel ratio to the target air-fuel ratio by using the DeNO$_x$ post injection amount to which the second post injection amount determination value is applied. The PCM 60 reduces the opening of the intake shutter valve 7 to be a desired opening based on the actual turbocharging pressure (the pressure detected by the pressure sensor 108) and the EGR gas amount so as to achieve this turbocharging pressure. Then, the process proceeds to S408.

Note that the intake shutter valve 7 is fully opened in the normal operating state of the engine E, whereas during DeNO$_x$, DPF regeneration, idle operation, etc., the opening of the intake shutter valve 7 is typically a given basic opening. In the operating state where the EGR gas is not introduced, the intake shutter valve 7 is feedback-controlled based on the turbocharging pressure.

At S408, the PCM 60 controls the fuel injector 20 to perform the post injection by applying the second post injection amount determination value to the DeNO$_x$ post injection amount, i.e., setting the DeNO$_x$ post injection amount to be the second post injection amount determination value. The PCM 60 actually performs the processing of S408 at S106 of the fuel injection control process illustrated in FIG. 3. Then the process proceeds to S409.

At S409, the PCM 60 determines whether the NO$_x$ stored amount in the NO$_x$ catalyst 45 is substantially zero. For example, the PCM 60 determines whether the NO$_x$ stored amount is substantially zero when the NO$_x$ stored amount estimated based on the operating state of the engine E, the flow rate of the exhaust gas, the temperature of the exhaust gas, etc. becomes substantially zero and the detection value of the NO$_x$ sensor 116 disposed immediately downstream of the DPF 46 changes (S409: YES). Then the process ends. Here, the PCM 60 ends the active DeNO$_x$ control process. The PCM 60 further resets the NO$_x$ stored amount used in the active DeNO$_x$ control process and the active DeNO$_x$ control execution flag setting process in FIG. 6 to zero.

On the other hand, when the NO$_x$ stored amount is not substantially zero (S409: NO), the process returns to S403. In this case, the PCM 60 continues the active DeNO$_x$ control. In other words, the PCM 60 continues the active DeNO$_x$ control until the NO$_x$ stored amount becomes almost zero. Particularly, even if the execution condition of the active DeNO$_x$ control (e.g., the condition of S403) is not satisfied during the active DeNO$_x$ control and the active DeNO$_x$ control is suspended, when the execution condition of the active DeNO$_x$ control is satisfied thereafter, the PCM 60 promptly resumes the active DeNO$_x$ control to bring the NO$_x$ stored amount to substantially zero.

Here, the NO$_x$ stored amount is determinable as substantially zero based on the detection value of the NO$_x$ sensor 116 because of the following reason. Since the NO$_x$ sensor 116 also functions as an oxygen concentration sensor, the detection value of the NO$_x$ sensor 116 corresponds to the air-fuel ratio reaches the NO$_x$ sensor 116. While the NO$_x$ catalyst 45 performs reduction, i.e., when the NO$_x$ stored amount is not substantially zero, oxygen generated by reducing $NO_x$ reaches the $NO_x$ sensor 116. On the other hand, when the $NO_x$ stored amount becomes substantially zero, such oxygen generated by reduction is no longer reaches the $NO_x$ sensor 116. Therefore, at the timing when the $NO_x$ stored amount becomes substantially zero, the air-fuel ratio reached the $NO_x$ sensor 116 reduces, thus the detection value of the $NO_x$ sensor 116 changes.

Figure 10:
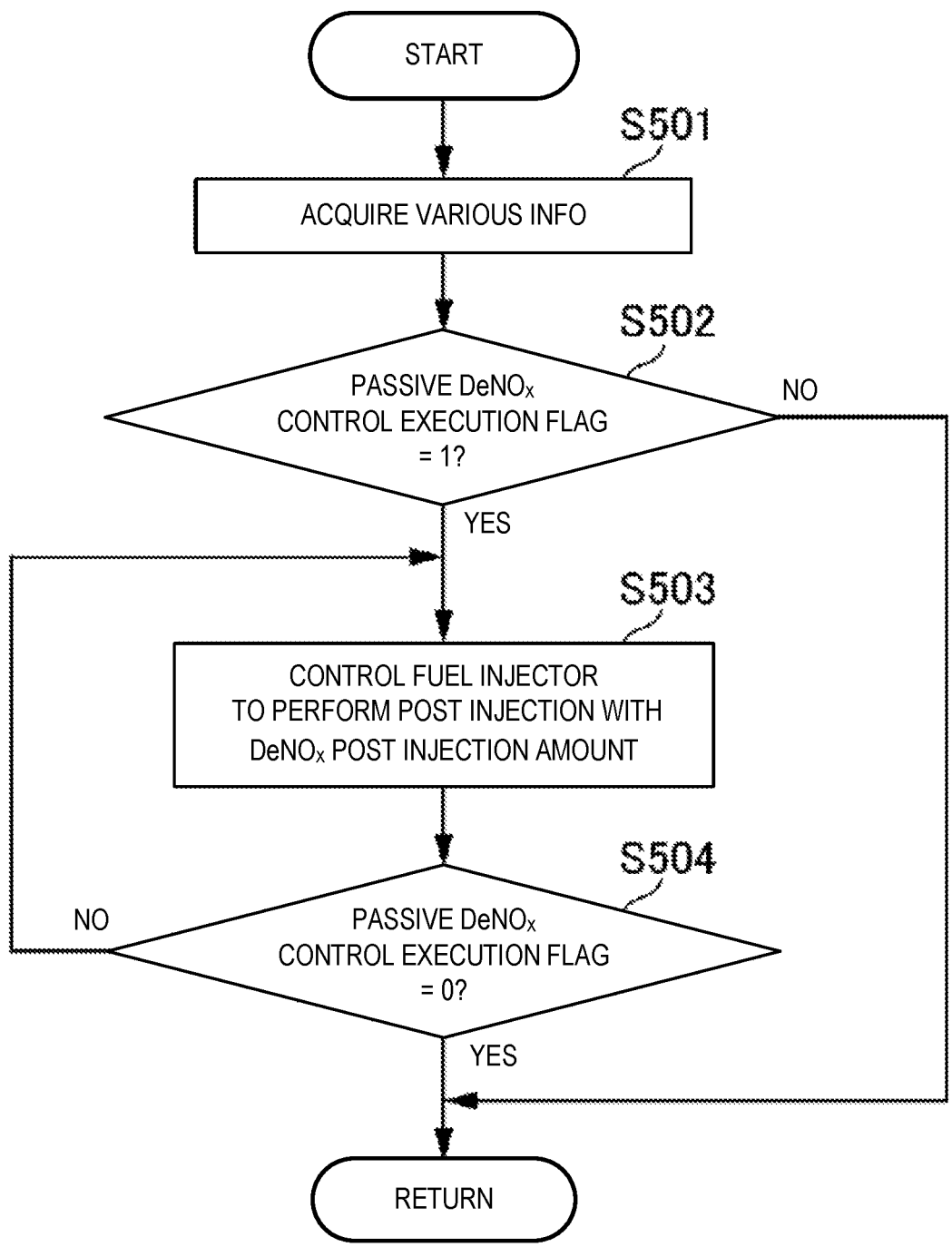
FIG. 10 is a flowchart illustrating the passive $DeNO_x$ control of the embodiment.

Next, the passive $DeNO_x$ control executed based on the passive $DeNO_x$ control execution flag set as described above is described with reference a flowchart (passive $DeNO_x$ control process) of FIG. 10. This passive $DeNO_x$ control process is executed repeatedly at a given cycle by the PCM 60 and is executed in parallel with the fuel injection control process illustrated in FIG. 3 and the passive $DeNO_x$ control execution flag setting process illustrated in FIG. 7.

First, at S501, the PCM 60 acquires various information of the vehicle. For example, the PCM 60 acquires at least the $DeNO_x$ post injection amount calculated as described above and the value of the passive $DeNO_x$ control execution flag set in the passive $DeNO_x$ control execution flag setting process illustrated in FIG. 7.

Next, at S502, the PCM 60 determines whether the passive $DeNO_x$ control execution flag acquired at S501 is "1." In other words, the PCM 60 determines whether the passive $DeNO_x$ control to be executed. If the passive $DeNO_x$ control execution flag is "1" (S502: YES), the process proceeds to S503. On the other hand, if the passive $DeNO_x$ control execution flag is "0" (S502: NO), the process is terminated without executing the passive $DeNO_x$ control.

Next, at S503, the PCM 60 controls the fuel injector 20 to perform the post injection with the $DeNO_x$ post injection amount acquired at S501, i.e., executes the passive $DeNO_x$ control. Actually, the PCM 60 performs the processing of S503 at S106 of the fuel injection control process illustrated in FIG. 3. Then the process proceeds to S504.

At S504, the PCM 60 determines whether the passive $DeNO_x$ control execution flag is "0." If the passive $DeNO_x$ control execution flag is "0" (S504: YES), the process ends. In this case, the PCM 60 ends the passive $DeNO_x$ control. On the other hand, if the passive $DeNO_x$ control execution flag is not "0" (S504: NO), i.e., if the passive $DeNO_x$ control execution flag is maintained at "1," the process returns to S503. In this case, the PCM 60 continues the passive $DeNO_x$ control. In other words, the PCM 60 continues the passive $DeNO_x$ control until the passive $DeNO_x$ control execution flag switches from "1" to "0."

<Operation and Effects>

Next, the operation and effects of the exhaust emission control system of the engine of this embodiment are described.

According to this embodiment, when the SCR temperature is above the SCR determination temperature, typically, $NO_x$ is purified by the SCR catalyst 47 and the performance of the $DeNO_x$ control is limited (e.g., prohibited). Even if the SCR temperature is above the SCR determination temperature, when the exhaust gas flow rate is large, the limitation on the performance of the $DeNO_x$ control is loosened. As a result, in a situation where the SCR catalyst 47 cannot sufficiently purify $NO_x$ due to a high exhaust gas flow rate, it is possible to secure the $NO_x$ purification performance of the $NO_x$ catalyst 45 by performing the $DeNO_x$ control, and discharge of $NO_x$ is suitably prevented. In other words, it is possible to improve the emission performance regarding NOR.

Particularly in this embodiment, in a case where the SCR temperature is above the SCR determination temperature, when the exhaust gas flow rate is high, the fourth stored amount determination value used for determining whether to perform the $DeNO_x$ control (threshold for determining the $NO_x$ stored amount in the $NO_x$ catalyst 45) is lower than when the exhaust gas flow rate is low, thus, performance of the $DeNO_x$ control is more likely to be permitted when the exhaust gas flow rate is high. Especially since the fourth stored amount determination value is smaller as the exhaust gas flow rate increases and the $DeNO_x$ control is performed according to the set fourth stored amount determination value, the $NO_x$ stored amount in the $NO_x$ catalyst 45 is suitably controlled. For example, it is possible to reduce the $NO_x$ stored amount of the $NO_x$ catalyst 45 to the fourth stored amount determination value by setting the fourth stored amount determination value according to the $NO_x$ purification performance of the SCR catalyst 47 (corresponding to the exhaust gas flow rate), and sufficient $NO_x$ purification performance of the $NO_x$ catalyst 45 is suitably secured according to the $NO_x$ purification performance of the SCR catalyst 47.

Further, in this embodiment, since the limitation on the $DeNO_x$ control is loosened in the passive $DeNO_x$ control when the SCR temperature is above the SCR determination temperature and the exhaust gas flow rate is high, the passive $DeNO_x$ control which is performed within the operating range of the engine where the exhaust gas flow rate is high (particularly, high-speed, high-load range) is surely performed and the $NO_x$ purification performance of the $NO_x$ catalyst 45 is effectively secured. On the other hand, the performance limitation described above is not loosened in the active $DeNO_x$ control which is performed within the medium-speed, medium-load range, therefore, the active $DeNO_x$ control is prevented from being performed within the operating range where the SCR catalyst 47 sufficiently purifies NOR.

<Modifications>

Although in the above embodiment the fourth stored amount determination value for determining the NO stored amount is set based on the exhaust gas flow rate (see FIG. 8), the fourth stored amount determination value may be set based on the engine speed and/or the engine load instead of the exhaust gas flow rate. Also in this case, the fourth stored amount determination value may be set lower as the engine speed and/or the engine load becomes higher.

Further in the above embodiment, performance of the passive $DeNO_x$ control is permitted when the $NO_x$ stored amount is above the fourth stored amount determination value, and performance of the passive $DeNO_x$ control is prohibited when the $NO_x$ stored amount is below the fourth stored amount determination value (see S306 in FIG. 7). In another example, performance of the passive $DeNO_x$ control may be limited without completely being prohibited when the $NO_x$ stored amount is below the fourth stored amount determination value. For example, when the $NO_x$ stored amount is below the fourth stored amount determination value, the target air-fuel ratio applied in the passive $DeNO_x$ control may be set leaner than when the $NO_x$ stored amount is above the fourth stored amount determination value (here, the air-fuel ratio at which $DeNO_x$ is secured is assumed to be maintained) so as to lower the $NO_x$ reduction efficiency by the passive $DeNO_x$ control. Thus, limiting the performance may include either prohibiting the performance or reducing the performance.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
25 Turbocharger
7 Intake Shutter Valve
17 Combustion Chamber
20 Fuel Injector
41 Exhaust Passage
43 EGR Device
45 $NO_x$ Catalyst
46 DPF
47 SCR Catalyst
60 PCM (controller)
200 Engine System
E Engine
EX Exhaust System
IN Intake System

What is claimed is:

1. An exhaust emission control system of an engine, including an $NO_x$ catalyst disposed in an exhaust passage of the engine and for storing $NO_x$ within exhaust gas when an air-fuel ratio of the exhaust gas is lean, and reducing the stored $NO_x$ when the air-fuel ratio is stoichiometric or rich, the system comprising:

an SCR catalyst disposed in the exhaust passage of the engine downstream of the $NO_x$ catalyst and for purifying $NO_x$ within the exhaust gas by causing a reaction with ammonia; and a processor configured to execute an $NO_x$ reduction controlling module for performing an $NO_x$ reduction control in which the air-fuel ratio of the exhaust gas is controlled to a target air-fuel ratio so that the stored NOx is reduced, the target air-fuel ratio being a ratio at which the stored $NO_x$ is reducible, wherein:

the $NO_x$ reduction controlling module limits the performance of the $NO_x$ reduction control when temperature of the SCR catalyst is above a given temperature, the limitation of the performance of the NOx reduction control being loosened in a given operating state of the engine in which a flow rate of the exhaust gas is above a given rate even when the temperature of the SCR catalyst is above the given temperature, the $NO_x$ reduction controlling module sets a determination value for the $NO_x$ stored amount and permits the performance of the $NO_x$ reduction control when the $NO_x$ stored amount is above the determination value, and when the temperature of the SCR catalyst is above the given temperature in the given operating state of the engine, the $NO_x$ reduction controlling module sets the determination value smaller than in an operating state of the engine in which the flow rate of the exhaust gas is below the given rate, so as to loosen the limitation on the performance of the $NO_x$ reduction control.

2. The system of claim 1, wherein the $NO_x$ reduction controlling module sets the determination value to be smaller as the flow rate of the exhaust gas increases.

3. The system of claim 1, wherein the $NO_x$ reduction controlling module sets the determination value to be smaller as at least one of an engine speed and an engine load is higher.

4. The system of claim 1, wherein the given operating state corresponds to an operating range of the engine where an engine speed is above a given speed and an engine load is above a given load.

5. The system of claim 1, wherein when the air-fuel ratio becomes rich due to acceleration of a vehicle, the $NO_x$ reduction controlling module performs the $NO_x$ reduction control to temporarily control the air-fuel ratio to the target air-fuel ratio.

6. An exhaust emission control system of an engine, including an $NO_x$ catalyst disposed in an exhaust passage of the engine and for storing $NO_x$ within exhaust gas when an air-fuel ratio of the exhaust gas is lean, and reducing the stored $NO_x$ when the air-fuel ratio is stoichiometric or rich, the system comprising:

an SCR catalyst disposed in the exhaust passage of the engine downstream of the $NO_x$ catalyst and for purifying $NO_x$ within the exhaust gas by causing a reaction with ammonia; and a processor configured to execute an $NO_x$ reduction controlling module for performing an $NO_x$ reduction control in which the air-fuel ratio of the exhaust gas is controlled to a target air-fuel ratio so that the stored $NO_x$ is reduced, the target air-fuel ratio being a ratio at which the stored $NO_x$ is reducible, wherein:

the $NO_x$ reduction controlling module limits the performance of the $NO_x$ reduction control when temperature of the SCR catalyst is above a given temperature, the limitation of the performance of the $NO_x$ reduction control being loosened in a given operating state of the engine in which a flow rate of the exhaust gas is above a given rate even when the temperature of the SCR catalyst is above the given temperature, the $NO_x$ reduction controlling module performs:

a first $NO_x$ reduction control in which the air-fuel ratio is temporarily controlled to the target air-fuel ratio when the air-fuel ratio becomes rich due to acceleration of a vehicle, and a second $NO_x$ reduction control in which the air-fuel ratio is continuously controlled to the target air-fuel ratio regardless of the air-fuel ratio becoming rich due to the acceleration of the vehicle so that the $NO_x$ stored amount falls below a given amount by reducing the $NO_x$ stored in the $NO_x$ catalyst, and when the temperature of the SCR catalyst is above the given temperature, the $NO_x$ reduction controlling module limits the performance of the second $NO_x$ reduction control regardless of the flow rate of the exhaust gas being above the given rate, and loosens the limitation on the performance of the first $NO_x$ reduction control in the given operating state of the engine.

7. The system of claim 1, wherein the $NO_x$ reduction controlling module limits the performance of the $NO_x$ reduction control by prohibiting the performance.

* * * * *